United States Patent [19]

Fergason

[11] Patent Number: 5,089,904
[45] Date of Patent: * Feb. 18, 1992

[54] ENCAPSULATED LIQUID CRYSTAL MATERIAL, APPARATUS AND METHOD

[76] Inventor: James L. Fergason, 92 Adam Way, Atherton, Calif. 94025

[*] Notice: The portion of the term of this patent subsequent to Mar. 6, 2001 has been disclaimed.

[21] Appl. No.: 606,429

[22] Filed: Oct. 31, 1990

Related U.S. Application Data

[60] Division of Ser. No. 339,072, Apr. 14, 1989, which is a division of Ser. No. 114,073, Oct. 27, 1987, Pat. No. 4,884,873, which is a division of Ser. No. 585,883, Mar. 2, 1984, Pat. No. 4,707,080, which is a continuation-in-part of Ser. No. 477,242, Mar. 21, 1983, Pat. No. 4,616,903, and a continuation-in-part of Ser. No. 477,138, Mar. 21, 1983, Pat. No. 4,606,611, and a continuation-in-part of Ser. No. 302,780, Sep. 16, 1981, Pat. No. 4,435,047.

[51] Int. Cl.$^5$ .............................................. G02F 1/133
[52] U.S. Cl. ........................................ 359/52; 359/51; 359/77; 359/94
[58] Field of Search ................ 350/334, 340, 347 E, 350/347 V

[56] References Cited

U.S. PATENT DOCUMENTS

| | | | |
|---|---|---|---|
| 3,341,466 | 9/1967 | Brynko et al. | 252/316 |
| 3,529,156 | 9/1970 | Fergason et al. | 350/351 |
| 3,565,559 | 2/1971 | Sato et al. | 424/37 |
| 3,565,818 | 2/1971 | Bayless et al. | 252/316 |
| 3,578,482 | 5/1971 | Whitaker et al. | 252/316 |
| 3,578,844 | 5/1971 | Churchill et al. | 350/351 |
| 3,585,381 | 6/1971 | Hodson et al. | 350/351 |
| 3,600,060 | 8/1971 | Churchill et al. | 350/331 R |
| 3,617,374 | 11/1971 | Hadson et al. | 428/1 |
| 3,661,142 | 5/1972 | Flam | 428/1 |
| 3,703,474 | 11/1972 | Huber et al. | 252/316 |
| 3,720,623 | 3/1973 | Cartmell et al. | 350/350 R |
| 3,802,945 | 4/1974 | James | 350/351 |
| 3,830,224 | 8/1974 | Vanzetti et al. | 350/334 |
| 3,871,904 | 3/1975 | Haas et al. | 350/350 S |
| 3,872,050 | 3/1975 | Benton et al. | 350/351 |
| 3,885,982 | 5/1975 | Fergason | 252/299.5 |
| 3,894,793 | 7/1975 | Haas | 252/299.2 |
| 3,910,681 | 10/1975 | Elliott et al. | 350/338 |
| 3,912,666 | 10/1975 | Spitzer et al. | 521/72 |

(List continued on next page.)

FOREIGN PATENT DOCUMENTS

| | | |
|---|---|---|
| 0010796 | 5/1980 | European Pat. Off. . |
| 2139537 | 12/1972 | France . |
| 49-96694 | 9/1974 | Japan . |
| 50-36993 | 10/1975 | Japan . |
| 51-30998 | 9/1976 | Japan . |
| 54-2580 | 2/1979 | Japan . |
| 54-31465 | 10/1979 | Japan . |
| 55-96922 | 7/1980 | Japan . |
| 1161039 | 1/1968 | United Kingdom . |
| 1376926 | 12/1974 | United Kingdom . |

OTHER PUBLICATIONS

*J. Applied Physics,* vol. 45, No. 11, Nov. 1974, White & (List continued on next page.)

*Primary Examiner*—Stanley D. Miller
*Assistant Examiner*—Anita P. Gross

[57] ABSTRACT

A liquid crystal apparatus includes a plurality of volumes of liquid crystal material in a containment medium such as a polymer. Some or all of the volumes of liquid crystal material can be interconnected. The walls defining the volumes tend to distort the natural liquid crystal structure in the absence of an electric field, and the optical and electrical properties of the material are such that in the absence of a field incident light is scattered or absorbed and in the presence of a field scattering and/or absorption are reduced. Pleochroic dye in the liquid crystal material increases absorption of incident light. The liquid crystal material may include an additive which tends to align the liquid crystal material in a direction generally normal to the walls. The apparatus may be used in an optical display, optical shutter, billboard, etc., and it functions independently of polarization.

33 Claims, 4 Drawing Sheets

U.S. PATENT DOCUMENTS

| | | | |
|---|---|---|---|
| 3,960,749 | 6/1976 | Fergason | 350/350 R |
| 4,032,219 | 6/1977 | Constant et al. | 350/350 R |
| 4,048,358 | 9/1977 | Shanks | 350/337 |
| 4,101,207 | 7/1978 | Taylor | 350/344 |
| 4,102,806 | 7/1978 | Kondo et al. | 252/316 |
| 4,140,016 | 2/1979 | Fergason | 350/350 R |
| 4,161,557 | 7/1979 | Suzuki et al. | 350/350 R |
| 4,166,800 | 9/1979 | Fong | 252/316 |
| 4,182,700 | 1/1980 | Benton et al. | 428/1 |
| 4,279,152 | 7/1981 | Crossland | 350/350 R |
| 4,301,054 | 11/1981 | Buirley et al. | 252/316 |
| 4,344,857 | 8/1982 | Shasha et al. | 252/316 |
| 4,354,385 | 10/1982 | Fraschini | 252/316 |
| 4,411,495 | 10/1983 | Beni et al. | 350/347 V |
| 4,433,637 | 2/1984 | Buirley et al. | 350/351 |
| 4,435,047 | 3/1984 | Fergaason | 350/334 |
| 4,501,503 | 2/1985 | Buirley et al. | 428/1 |
| 4,556,289 | 12/1985 | Fergason | 350/347 E |
| 4,565,764 | 1/1986 | Nakahara et al. | 430/111 |
| 4,578,340 | 3/1986 | Saccocia et al. | 430/138 |
| 4,579,423 | 4/1986 | Fergason | 350/334 |
| 4,591,233 | 5/1986 | Fergason | 350/334 |
| 4,596,445 | 6/1986 | Fergason | 350/334 |
| 4,605,284 | 8/1986 | Fergason | 350/334 |
| 4,606,611 | 8/1986 | Fergason | 350/334 |
| 4,616,903 | 10/1986 | Fergason | 350/334 |
| 4,643,528 | 2/1987 | Bell | 350/334 |
| 4,662,720 | 5/1987 | Fergason | 350/334 |
| 4,707,080 | 11/1987 | Fergason | 350/334 |
| 4,814,211 | 3/1989 | Buckley et al. | 428/1 |
| 4,844,596 | 7/1989 | Fergason | 350/344 |
| 4,884,873 | 12/1989 | Fergason | 350/336 |

OTHER PUBLICATIONS

Taylor, "New Absorptive Mode Reflective Liquid-Crystal Display Device", pp. 4718–4723.

Craighead et al., "New Display Based on Electrically Induced Index Matching in An Inhomogeneous Medium", *Appl. Phys. Lett.*, vol. 40, No. 1 (1 Jan. 1982), pp. 22–24.

Wysocki et al., "Electric-Field-Induced Phase Change in Cholesteric Liquid Crystals", *Physical Review Letters*, vol. 20, No. 19 (6 May 1968), pp. 1024–1025.

Heilmeier et al., "Dynamic Scattering in Nematic Liquid Crystals", *Applied Physical Letters*, vol. 13, No. 1 (1 Jul. 1968), pp. 46–47.

Frederic J. Kahn, "Ir-Laser-Addressed Thermo-Optic Smectic Liquid-Crystal Storage Displays", *Appl. Phys. Lett.*, vol. 22, No. 3 (1 Feb. 1973), pp. 111–113.

Beni et al., "Electro-Wetting Displays", *Appl. Phys. Lett.*, vol. 38, No. 4, (15 Feb. 1981), pp. 207–209.

Cheng et al., "Boundary-Layer Model of Field Effects in a Bistable Liquid-Crystal Geometry", *J. Appl. Phys.*, vol. 52, No. 4 (Apr. 1981), pp. 2756–2765.

Cheng et al., "The Propagation of Disclinations in Bistable Switching", *J. Appl. Phys.*, vol. 52, No. 4 (Apr. 1981), pp. 2766–2775.

Beni et al., "Anisotropic Suspension Display", *Appl. Phys. Lett.*, vol. 39, No. 3 (1 Aug. 1981), pp. 195–197.

Poziomek et al., "Spectroscopic Studies of Dyes in Liquid Crystal Impregnated Microporous Polypropylene Films", *Liquid Crystals and Ordered Fluids*, vol. 3, 1978, pp. 259–270.

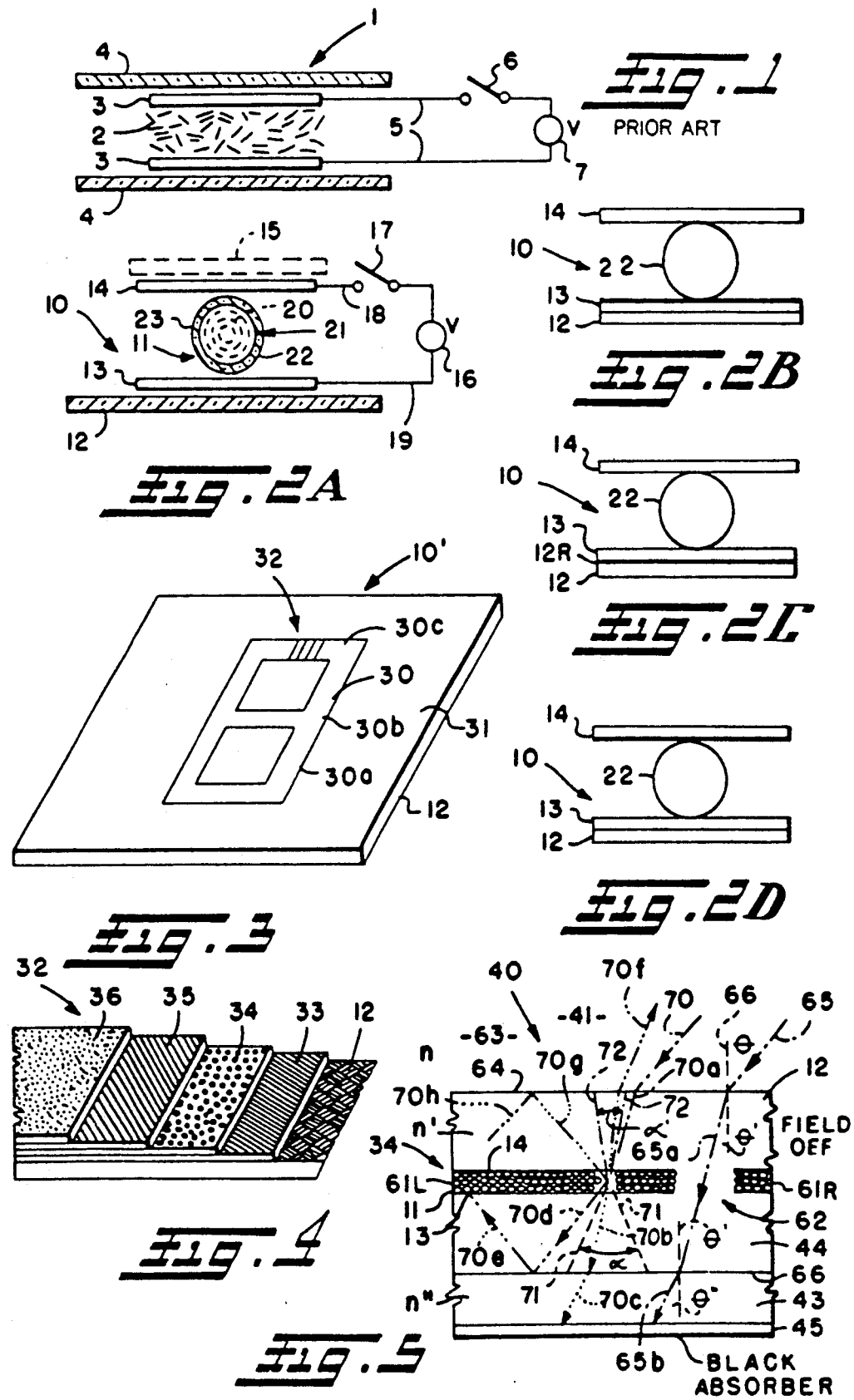

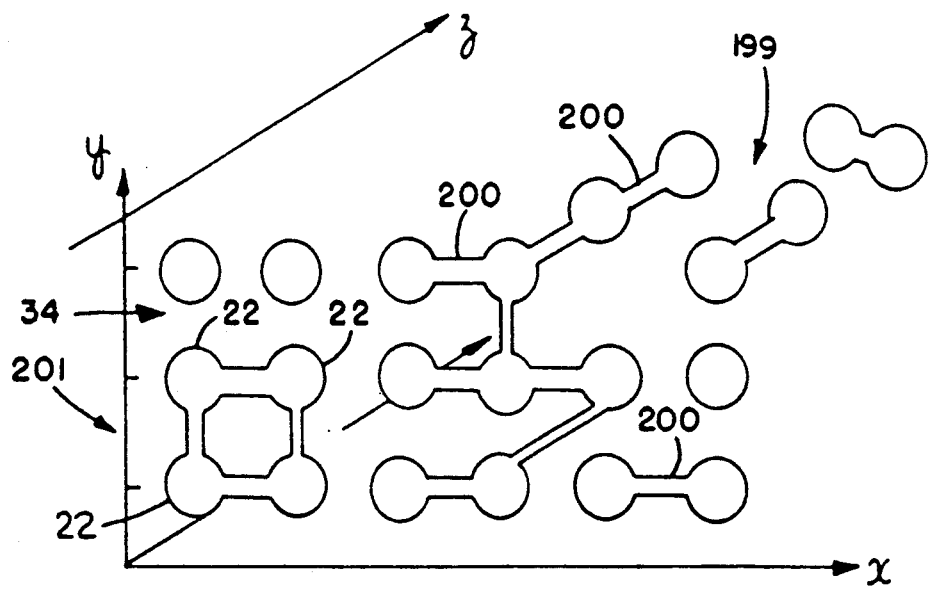
Fig. 15
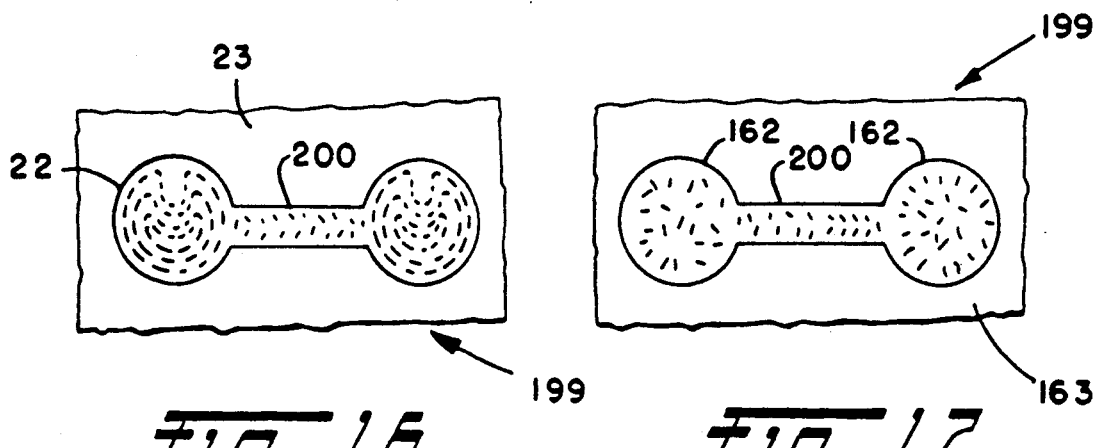
Fig. 16
Fig. 17
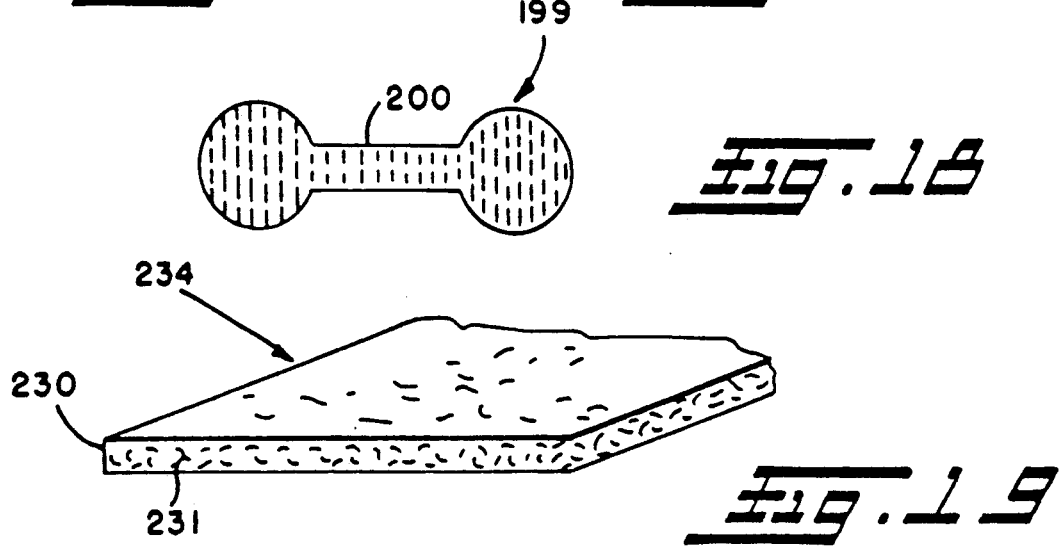
Fig. 18
Fig. 19

ENCAPSULATED LIQUID CRYSTAL MATERIAL, APPARATUS AND METHOD

CROSS REFERENCE TO RELATED APPLICATION

This application is a division of applicant's co-pending, commonly assigned U.S. patent application Ser. No. 07/339,072, filed Apr. 14, 1989, which is a division of commonly assigned U.S. patent application Ser. No. 114,073, filed Oct. 27, 1987, for ENCAPSULATED LIQUID CRYSTAL MATERIAL, APPARATUS AND METHOD, now U.S. Pat. No. 4,884,873 which in turn is a division of commonly assigned U.S. patent application Ser. No. 585,883, filed Mar. 2, 1984, now U.S. Pat. No. 4,707,080, issued Nov. 17, 1987, for ENCAPSULATED LIQUID CRYSTAL MATERIAL, APPARATUS AND METHOD; U.S. patent application Ser. No. 585,883 (now U.S. Pat. No. 4,707,080) is a continuation-in-part of commonly assigned U.S. patent application Ser. No. 302,780, filed Sept. 16, 1981, for ENCAPSULATED LIQUID CRYSTAL AND METHOD, now U.S. Pat. No. 4,435,047, issued Mar. 6, 1984, and of U.S. patent application Ser. No. 477,138, filed Mar. 21, 1983, for ENHANCED SCATTERING IN VOLTAGE SENSITIVE ENCAPSULATED LIQUID CRYSTAL, now U.S. Pat. No. 4,606,611, issued Aug. 19, 1986, and of U.S. patent application Ser. No. 477,242, filed Mar. 21, 1983, for ENCAPSULATED LIQUID CRYSTAL AND METHOD, now U.S. Pat. No. 4,616,903, issued Oct. 14, 1986, the entire disclosures of which hereby are incorporated by reference.

TECHNICAL FIELD

The present invention relates generally to liquid crystals and, more particularly, to encapsulated liquid crystals. Moreover, the invention relates to devices using such encapsulated liquid crystals and to methods of making such encapsulated liquid crystals and devices.

BACKGROUND

Liquid crystals currently are used in a wide variety of devices, including optical devices such as visual displays. Such devices usually require relatively low power and have a satisfactory response time, provide reasonable contrast, and are relatively economical. The property of liquid crystals enabling use, for example, in visual displays, is the ability of liquid crystals to transmit light on one hand, and to scatter and/or absorb light, on the other, depending on the alignment (or lack of alignment) of the liquid crystal structure with respect to a prescribed input, e.g. an electric field applied across the liquid crystal material. An example of electrically responsive liquid crystal material and use thereof is provided in U.S. Pat. No. 3,322,485.

Certain liquid crystal material is responsive to temperature, changing optical characteristics in response to temperature of the liquid crystal material.

The invention of the present application is disclosed hereinafter particularly with reference to the use of liquid crystal material that is particularly responsive to a prescribed input preferably of the electromagnetic type, and, more particularly, to an electric field.

Currently there are three categories of liquid crystal materials, namely cholesteric, nematic and smectic types. The invention of the present application relates in the preferred embodiment described below to use of liquid crystal material which is operationally nematic (as hereinafter defined). However, various principles of the invention may be employed with various one or ones of the other known types of liquid crystal material or combinations thereof. The various characteristics of the cholesteric, nematic and smectic types of liquid crystal material are described in the prior art. One known characteristic of liquid crystal material is that of reversibility; in particular it is noted here that nematic liquid crystal material is known to be reversible, but cholesteric material is not reversible. One characteristic of a reversible material is that the liquid crystal structure will return to its original configuration after an electric field has been applied and then removed.

To enhance contrast and possibly other properties of liquid crystal material, pleochroic dyes have been mixed with the liquid crystal material to form a solution therewith. The molecules of the pleochroic dye generally align with the molecules of the liquid crystal material. Therefore, such pleochroic dyes will tend to function optically in a manner similar to that of the liquid crystal material in response to a changing parameter, such as application or non-application of an electric field. Examples of the use of pleochroic dyes with liquid crystal material are described in U.S. Pat. Nos. 3,499,702 and 3,551,026.

An important characteristic of liquid crystal material is anisotropy. An anisotropic material has different physical properties in different directions. For example, liquid crystals are optically anisotropic i.e. they have indices of refraction which vary with the direction of propagation and polarization of the incident light.

Liquid crystal material also has electrical anisotropy. For example, the dielectric constant for nematic liquid crystal material may be one value when the liquid crystal structure is parallel to the electric field and may have a different value when the liquid crystal structure is aligned perpendicular to an electric field. Since such dielectric value is a function of alignment, for example, reference to the same as a "dielectric coefficient" may be more apt than the usual "dielectric constant" label. Similar properties are true for other types of liquid crystals.

Some brief discussion of the encapsulation of cholesteric liquid crystal material is presented in U.S. Pat. Nos. 3,720,623, 3,341,466, and 2,800,457, the latter two patents being referred to in the first named patent.

In the past, devices using liquid crystals, such as visual display devices or other devices, have been of relatively small size. Large size devices using liquid crystals, such as, for example, a billboard display or a sign have not been satisfactorily fabricatable for a number of reasons. One reason is the fluidity of the liquid crystals (the liquid crystal material may tend to flow creating areas of the display that have different thicknesses). As a result, the optical characteristics of the display may lack uniformity, have varying contrast characteristics at different portions of the display, etc.; the thickness variations in turn cause variations or gradations in optical properties of the liquid crystal device. Moreover, the varying thickness of the liquid crystal layer will cause corresponding variations in the electrical properties of the liquid crystal layer, such as capacitance and impedance, further reducing uniformity of a large size liquid crystal device. The varying electrical properties of the liquid crystal layer, then, also may cause a corresponding variation in the effective electric field applied across the liquid crystal material and/or in response to a constant electric field would respond differently at areas of the liquid crystal that are of different thicknesses.

A pleochroic display, i.e. one in which pleochroic dye and liquid crystal material are in solution together, has the advantage of not requiring the use of a polarizer. However, such a pleochroic device has a disadvantage of relatively low contrast when only nematic liquid crystal material is used. It was discovered in the past, though, that a cholesteric liquid crystal could be added to the nematic one together with the dye to improve the contrast ratio. See White et al article, *"Journal of Applied Physics"*, Volume 45, No. 11, November 1974, at pages 4718–4723, for example. The cholesteric material would tend not to return to its original zero field form when the electric field is removed.

Another problem encountered with pleochroic dye included in solution with liquid crystal material, regardless of the particular type of liquid crystal material, is that the light absorption of the dye is not zero in the "field-on" condition; rather such absorption in the "field-on" condition follows a so-called ordering parameter, which relates to or is a function of the relative alignment of the dyes. The optical transmission characteristic of liquid crystal material is an exponential function of the thickness of the liquid crystal material; specifically, the "on" state or "field-on" or "energized" state of the liquid crystal material is an exponential function of the thickness of the liquid crystal material, and the "absorbing" state or "off" state also is a different exponential function of the thickness.

To overcome those problems described in the two immediately preceding paragraphs, the liquid crystal material should have an optimum uniform thickness. (As used herein the term "liquid crystal" material may mean[s] the liquid crystals themselves and, depending on context, the pleochroic dye and/or other additives in solution or otherwise included therewith). There also should be an optimum spacing of the electrodes by which the electric field is applied to the liquid crystal material. To maintain such optimum thickness and spacing, rather close tolerances must be maintained. To maintain close tolerances, there is a limit as to the size of the device using such liquid crystals, for it is quite difficult to maintain close tolerances over large surface areas, for example.

BRIEF SUMMARY OF THE INVENTION

Briefly, according to one aspect of the invention, liquid crystal material is encapsulated; according to another aspect the encapsulated liquid crystal material is used in liquid crystal devices, such as relatively large size visual display devices and optical shutters; and according to further aspects there are provided methods for encapsulating liquid crystal material and for making a liquid crystal device using such encapsulated liquid crystal material.

Some terms used herein generally are defined as follows: "liquid crystal material" broadly refers to any type of liquid crystal material that will work in the context of the present invention, but preferably refers to operationally nematic liquid crystal material. By "operationally nematic" is meant that, in the absence of external fields, structural distortion of the liquid crystal is dominated by the orientation of the liquid crystal at its boundaries rather than by bulk effects, such as very strong twists (as in cholesteric material) or layering (as in smectic material). Thus, for example, an otherwise operationally nematic liquid crystal having also chiral ingredients which induce a tendency to twist but cannot overcome the effects of boundary alignment would still be considered operationally nematic. Operationally nematic liquid crystal material may include pleochoric dyes, chiral compounds, or other co-ingredients. The boundary which affects such orientation may be a surface, and, therefore, reference to boundary effect or surface effect may be used equivalently herein. Such boundary or surface may be a wall of a device or medium which contains the liquid crystal, such as a capsule, containment medium, or the like. The liquid crystal should have positive dielectric anisotropy.

A capsule refers to a containment device or medium that contains or confines a quantity of liquid crystal material, and "encapsulating medium" or "material" is that medium or material of which such capsules are formed. An "encapsulated liquid crystal" or "encapsulated liquid crystal material" means a quantity of liquid crystal material confined or contained in volumes within the encapsulating medium, for example in a solid medium as individual capsules or dried stable emulsions. Such volumes preferably are discrete volumes, i.e. once formed, they ordinarily remain as individually distinct entities or separate entities. However, it has been discovered that such separate entities or discrete volumes may be interconnected, for example by one or more passages. Preferably liquid crystal material would be in both the discrete volumes and in such interconnecting passages. Thus, as used herein "capsule" may refer to either a closed individual capsule or a capsule that is interconnected to another such that, for example, the internal volumes of respective interconnected passages are fluidically coupled via one or more of the mentioned interconnecting passages.

Capsules according to this invention generally have an approximately spherical configuration (though this is not, per se, a requisite of the invention) having a diameter from about 0.3 to 100 microns, preferably 1 to 30 microns, especially 1 to 5 microns. In the context of this invention, encapsulation and like terms refer not only to the formation of such articles as are generally referred to as capsules, but also to the formation of stable emulsions or dispersions of the liquid crystal material in an agent (an encapsulating medium) which results in the formation of stable, preferably approximately uniformly sized, particles in a uniform surrounding medium. The above-mentioned interconnecting passages also may exist between otherwise separate capsule-like particle volumes in such medium and preferably likewise would contain liquid crystal material. Techniques for encapsulation, generally referred to as microencapsulation because of the capsule size, are well known in the art (see, e.g., "Microcapsule Processing and Technology" by Asaji Kondo, published by Marcel Dekker, Inc.) and it will be possible for one skilled in the art, having regard to the disclosure herein, to determine suitable encapsulating agents and methods for liquid crystal materials.

A liquid crystal device is a device formed of liquid crystal material. In the present invention such devices are formed of encapsulated liquid crystals capable of providing a function of the type typically inuring to liquid crystal material; for example, such a liquid crystal device may be a visual display or an optical shutter that in response to application and removal of an electric field effects a selected attenuation of optical radiation, preferably including from far infrared through ultraviolet wavelengths. The invention may be used in connection with optical radiation, light or any other electromagnetic radiation or waves such that the liquid crystal in response to the presence or not of a prescribed input will cause a detectable variations, e.g. attenuation, transmission, etc.

One method of making encapsulated liquid crystals includes mixing together liquid crystal material and an encapsulating medium in which the liquid crystal material will not dissolve and permitting formation of discrete capsules containing the liquid crystal material.

A method of making a liquid crystal device including such encapsulated liquid crystal includes, for example applying such encapsulated liquid crystal material to a substrate. Moreover, such method may include providing means for applying an electric field to the liquid crystal material to affect a property thereof.

According to another feature of the invention an operationally nematic material in which is dissolved a pleochroic dye is placed in a generally spherical capsule. In the absence of an electric field, the capsule wall distorts the liquid crystal structure so it and the dye will tend to absorb light regardless of its polarization direction. When a suitable electric field is applied across such a capsule, for example across an axis thereof, the liquid crystal material will tend to align parallel to such field causing the absorption characteristic of such material to be reduced to one assumed when the liquid crystal material is in the planar configuration. To help assure that adequate electric field is applied across the liquid crystal material in the capsule, and not just across or through the encapsulating medium, and, in fact, with a minimum voltage drop across the wall thickness of the respective capsules, the encapsulating material preferably has a dielectric constant no less than the lower dielectric constant of the liquid crystal material, on the one hand, and a relatively large impedance, on the other hand. Ideally, the dielectric constant of the encapsulating medium should be close to the higher dielectric constant of the liquid crystal.

Contrast of a liquid crystal device employing encapsulated liquid crystals may be improved by selecting an encapsulating medium that has an index of refraction that is matched to the ordinary index of refraction of the liquid crystal material (i.e. the index of refraction parallel to the optical axis of the crystal). See, e.g. "Optics" by Borne & Wolf, or "Crystals and the Polarizing Microscope" by Hartshorne & Stewart. The encapsulating medium may be used not only to encapsulate liquid crystal material but also to adhere the capsules to a substrate for support thereon. Alternatively, a further binding medium may be used to hold the liquid crystal capsules relative to a substrate. In the latter case, though, preferably the additional binding medium has an index of refraction which is matched to that of the encapsulating medium for maintaining the improved contrast characteristic described above. Because the index of refraction of a material is generally strain-dependent, and strain may be induced in, e.g. the encapsulating medium, it may be necessary to consider this effect in matching the indices of refraction of the liquid crystal, encapsulating medium, and binding medium, if present. Further, if iridescence is to be avoided, it may be desirable to match the indices of refraction over a range of wavelengths to the extent possible, rather than at just one wavelength.

A feature of the spherical or otherwise curvilinear surfaced capsule which confines the liquid crystal material therein in accordance with the present invention is that the liquid crystal material tends to follow the curvature or otherwise to align itself generally parallel with the curved surfaces of such capsule. Accordingly, the liquid crystal structure tends to be forced or distorted to a specific form, being folded back on itself in a sense as it follows the capsule wall, so that the resulting optical characteristic of a given capsule containing liquid crystal material is such that substantially all light delivered thereto will be affected, for example, scattered (when no pleochroic dye is present) or absorbed (when pleochroic dye is present), when no electric field is applied, regardless of the polarization direction of the incident light. Even without dye this effect can cause scattering and thus opacity. Scattering would be due in large part to the refraction of light since the extraordinary index of refraction of the liquid crystal material preferably is different from the index of refraction of the encapsulating medium; absorption would be due in large part to the absorbing characteristic of the dye vis-a-vis such scattered light. In the presence of a prescribed input, say an electric field, though, the liquid crystal structure aligns with the field and effectively becomes optically transmissive with respect to or at least reduces the amount of scattering and/or absorption of incident light, as is described in greater detail below.

It has been discovered, too, that in the absence of a prescribed input (electric field) the liquid crystal structure of operationally nematic liquid crystal material may align generally normal to the surface, e.g. the inner wall of a capsule, at such surface instead of parallel thereto. Thus, such structure on average would not be aligned with the direction of incident light. Also, due to the limited volume of the capsule, the structure of the liquid crystal that is spaced away from such surface or wall will be curved or distorted. Therefore, in the absence of the prescribed input (electric field) such encapsulated liquid crystal functions substantially the same as does that which encounters parallel alignment with the capsule wall; and the same is true for transmissive operation in the presence of the prescribed inut. Similar operation would occur, too, if some of the liquid crystal were parallel and some normal to the surface or capsule wall.

Another feature is the ability to control the effective thickness of the liquid crystal material contained in a capsule by controlling the internal diameter of such capsule. Such diameter control may be effected by a size fractionation separation process during the making of the encapsulated liquid crystals using any one of a variety of conventional or novel sorting techniques as well as by controlling the mixing process, the quantities of ingredients, and/or the nature of the ingredients provided during mixing. By controlling such thickness parameter to relatively close tolerances, then, the subsequent tolerance requirements when the final liquid crystal device is made using the encapsulated liquid crystals will not be as critical as was required in the past for non-encapsulated devices.

However, a further and very significant feature of the present invention is that there appears to be no limitation on the size of a high quality liquid crystal device that can be made using the encapsulated liquid crystals in accordance with the present invention. More specifically, by providing for confinement of discrete quantities of liquid crystal material, for example, in the described capsules, the various problems encountered in the past that prevented the use of liquid crystal material in large size devices are overcome, for each individual capsule in effect can still operate as an independent liquid crystal device. Such operation still has been found effective even with the existence of the mentioned interconnecting passages between respective capsules or capsule-like volumes. Indeed all of the aspects and features of the present invention vis-a-vis individual unconnected capsules have been found to be applicable to arrangement of capsules that have one or more interconnecting passages. Moreover, each capsule preferably has physical properties enabling it to be mounted in virtually any environment including one containing a plurality of further such liquid crystal capsules mounted to a substrate or otherwise supported for use in response to application and removal of some type of excitation source, such as, for example, an electric or magnetic field. This feature also enables placement of the liquid crystal material on only selected areas of the optical device, such as in large size displays (e.g. billboards), optical shutters, etc.

Important considerations in accordance with the invention, and the discovery of the inventor, are that an encapsulating medium having electrical properties matched in a prescribed way to the electrical properties of liquid crystal material encapsulated thereby and additionally preferably optically matched to optical properties of such liquid crystal material permits efficient and high quality functioning of the liquid crystal material in response to excitation or non-excitation by an external source; and that the interaction of the encapsulating medium with the liquid crystal material distorts the latter in a prescribed manner changing an operational mode of liquid crystal material. Regarding the latter, by forcing the liquid crystal structure to distort into generally parallel or conforming alignment with the capsule wall, the liquid crystals will absorb or block, rather than transmit, light when not subject to an electric field and will be functional with respect to all manners of incident light regardless of the direction of polarization, if any, of such incident light.

Another feature of the invention is the discovery of particularly efficient and/or effective methods for building a film or fixed emulsion or dispersion of encapsulated liquid crystal.

With the foregoing in mind, a primary object of the invention is to enable the use of liquid crystal material over relatively large surfaces, and especially to effect the same while maintaining relatively high quality of operation, controlled uniformity of output and satisfactory contrast, which is achieved by the encapsulation of that material.

Another primary object is to confine liquid crystal material while maintaining the optical characteristics of such material, and especially to effect the same while also maintaining electrical responsiveness of the liquid crystal material.

Additional objects include improving methods of making encapsulated liquid crystal and devices thereof and improving operation of such encapsulated liquid crystal material and such devices employing same.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawing setting forth in detail a certain illustrative embodiment of the invention, this being indicative, however, of but one of the various ways in which the principles of the invention may be suitably employed.

BRIEF DESCRIPTION OF THE DRAWING

In the annexed drawing:

FIG. 1 is a schematic representation of a prior art liquid crystal device;

FIG. 2A is a schematic representation of a liquid crystal device in accordance with the present invention;

FIGS. 2B, 2C, and 2D are schematic representations of alternate embodiments of liquid crystal devices in accordance with the invention, demonstrating different respective reflector arrangements;

FIG. 3 is an isometric view of a liquid crystal display device in accordance with the present invention;

FIG. 4 is an enlarged fragmentary view, partly broken away, of a portion of the liquid crystal display device of FIG. 3;

FIG. 5 is a schematic representation of a liquid crystal apparatus embodying scattering principle of operation and total internal reflection of scattered light in the field-off condition and light transmission in the field-on condition;

FIG. 15 is a schematic representation of a matrix of encapsulated liquid crystal, multiple capsules thereof being coupled by interconnecting passages therebetween;

FIGS. 16, 17 and 18 are schematic illustrations of pairs of such interconnected capsules in the field-off and field-on conditions; and FIG. 19 is a schematic representation of a further alternate embodiment employing liquid crystal material in a porous medium.

SUMMARY OF A PRIOR ART LIQUID CRYSTAL DEVICE

Figure 6:
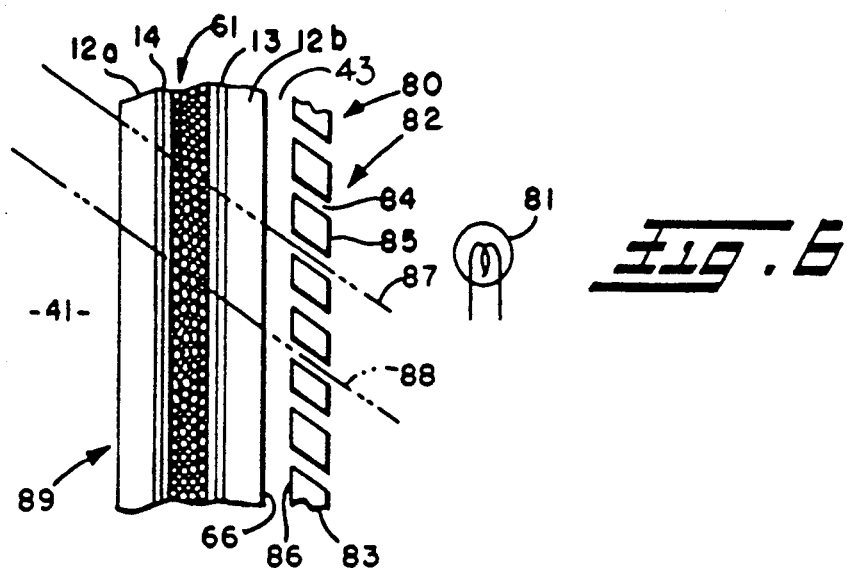
FIGS. 6 and 7 are schematic illustrations of still another embodiment of liquid crystal apparatus with a light control film director provided with incident illumination from the non-viewing side, respectively, in the field on and field off conditions.

Referring now in detail to the drawing, wherein like reference numerals designate like parts in the several figures, and initially to FIG. 1, a prior art liquid crystal device is generally indicated at 1. Such device 1 includes liquid crystal material 2 sandwiched between electrodes 3 of, for example, indium tin oxide that are deposited for support on respective mounting or confining substrates 4, such as glass, plastic sheets or the like. The sheets 4 may be clear as may be the electrodes 3 so that the device 1 is an optical transmission control device, whereby incident light may be absorbed and/or scattered when no electric field is applied by the electrodes 3 across a liquid crystal material 2 and the incident light may be transmitted through the liquid crystal material 2 when an electric field is applied thereacross. Electric leads 5 and switch 6 selectively couple voltage source 7 across the electrodes 3 to provide such electric field. The voltage source 7 may be either an AC or a DC voltage source.

The liquid crystal material 2 in the device 1 is somewhat confined by the substrates 4 for retention in a desired location, say for example, to be used overall as part of a digital display device. On the other hand, the liquid crystal material 2 must have adequate freedom of movement so that it may assume either a random orientation or distribution when no electric field is applied or a prescribed distributional or orientational alignment when an electric field is applied across the electrodes 3. If desired, one of the substrates 4 may be reflective to reflect incident light received through the liquid crystal material 2 back through the latter for delivery through the other substrate 4 for subsequent use. The various principles of operation and features and disadvantages of the liquid crystal device 1 are summarized above and are described in the prior art literature.

The liquid crystal material 2 may be of virtually any type that is responsive to an electric field applied thereacross so as to have a desired operating characteristic intended for the device 1; the liquid crystal material 2 also may include, if desired, pleochroic dye material in solution therewith.

DESCRIPTION OF THE PREFERRED EMBODIMENT

Turning now to FIG. 2A, an improved liquid crystal device in accordance with the present invention is indicated at 10. The device 10 includes an encapsulated liquid crystal 11 which is supported by a mounting substrate 12 across which an electric field may be applied via electrodes 13, 14.

The electrode of 13 may be, for example, a quantity of vacuum deposited indium tin oxide applied to the substrate 12, and the electrode 14 may be, for example, electrically conductive ink. A protective layer or coating 15 may be applied over the electrode 14 for protective purposes but such layer 15 ordinarily would not be necessary for supporting or confining the encapsulated liquid crystal 11 or the electrode 14. Voltage may be applied to the electrodes 13, 14 from an AC or DC voltage source 16, selectively closable switch 17, and electrical leads 18, 19 in turn to apply an electric field across the encapsulated liquid crystal 11 when the switch 17 is closed.

The encapsulated liquid crystal 11 includes liquid crystal material 20 contained within the confines or interior volume 21 of a capsule 22. Preferably the capsule 22 is generally spherical. However, the principles of the invention would apply when the capsule 22 is of a shape other than spherical. Such shape should provide the desired optical and electrical characteristics that will satisfactorily coexist with the optical characteristics of the liquid crystal 20, e.g. index of refraction, and will permit an adequate portion of the electric field to occur across the liquid crystal material 20 itself for effecting desired alignment of the liquid crystal structure when it is desired to have a field on condition.

The mounting substrate 12 and the electrodes 13, 14 as well as the protective coating 15 may be optically transmissive so that the liquid crystal device 10 is capable of controlling transmission of light therethrough in response to whether or not an electric field is applied across the electrodes 13, 14 and, thus, across the encapsulated liquid crystal 11. Alternatively, the mounting substrate 12 may be optically reflective (e.g. a mirror) or may have thereon an optically reflective coating so that reflection by such reflective coating of incident light received through the protective coating 15 will be a function of whether or not there is an electric field applied across the encapsulated liquid crystal 11. Several of these reflector alternatives are shown in FIGS. 2B and 2C. In FIG. 2B the electrode 13 itself is optically reflective; the viewing side of the device 10 shown in FIG. 2B, then, would be at or from beyond the electrode 14. The reflective electrode 13 reflects light toward the encapsulated liquid crystal material and/or back out through the transparent electrode 14 for viewing. In FIG. 2C a reflector 12R is located between the substrate or support 12 and the electrode 13; in this embodiment both electrodes 13 and 14 would be transparent. Furthermore, the total internal reflection and/or interference principles with respect to light scattered by liquid crystal in the "field off" condition, as is disclosed in detail in the above application Ser. No. 477,138 are operable and useful in accordance with the present invention and are intended to be a part hereof, being specifically incorporated fully by reference; this embodiment is the preferred one according to the present invention. Using a reflector, for example, as is mentioned herein, it would be possible to obtain a bright output, such as a bright character, on a dark background when the liquid crystal used is placed on or relative to the support or mounting substrate 12 in patterned configuration. Moreover, if the electrode also were patterned, it would be possible to obtain either a bright character on a dark background or a dark character on a bright background, depending on the relationships of the components and how they are used.

A plurality of encapsulated liquid crystals 11 would be applied to the mounting substrate 12 in a manner such that the encapsulated liquid crystals adhere to the mounting substrate 12 or to an interface material, such as the electrode 13, for support by the mounting substrate 12 and retention in a fixed position relative to the other encapsulated liquid crystals 11. Most preferably the encapsulating medium 23 of which the capsule 22 is formed is also suitable for binding or otherwise adhering the capsule 22 to the substrate 12. Alternatively, a further binding medium (not shown) may be used to adhere the encapsulated liquid crystals 11 to the substrate 12. Since the capsules 22 are adhered to the substrate 12, and since each capsule 22 provides the needed confinement for the liquid crystal material 20, a second mounting substrate, such as the additional one shown in the prior art liquid crystal device 1 of FIG. 1, ordinarily would be unnecessary. However, for the purpose of providing protection from scarring, electrochemical deterioration, e.g. oxidation, or the like, of the electrode 14, a protective coating 15 may be provided on the side or surface of the liquid crystal device 10 opposite the mounting substrate 12, the latter providing the desired physical protection on its own side of the device 10.

Since the encapsulated liquid crystals 11 are relatively securely adhered to the substrate 12 and since there ordinarily would be no need for an additional substrate, as mentioned above, the electrode 14 may be applied directly to the encapsulated liquid crystals 21.

Turning now to FIG. 3, an example of a liquid crystal device 10' in accordance with the invention is shown in the form of a liquid crystal display device, which appears as a square cornered figure eight 30 on the substrate 12, which in this case preferably is of a plastic material, such as Mylar, or may alternatively be another material, such as glass, for example. The shaded area appearing in FIG. 3 to form the square cornered figure eight is formed of plural encapsulated liquid crystals 11 arranged in one or more layers on and adhered to the substrate 12.

An enlarged fragmentary section view of a portion 32 of the figure eight 30 and substrate 12 is illustrated in FIG. 4. As is seen in FIG. 4, on the surface 31 of the substrate 12, which may be approximately 10 mils thick, is deposited a 200 angstrom thick electrode layer 33 of, for example, indium tin oxide or other suitable electrode material such as gold, silver, aluminum, platinum, paladium, rodium, nickel, chrome, tin oxide, antimony tin oxide, various other materials mentioned herein and equivalents, etc. Moreover, exemplary materials for such reflective electrode 13 would be, for example, gold, silver, aluminum, platinum, palladium, rodium, nickel and chrome. Further, the electrode 14 may be optically reflective, and an example would be an electrically conductive optically reflective electrode of printed ink or ink-like material; in this embodiment, for example, as is illustrated in FIG. 2D, the substrate 12 would be generally transparent, and viewing would be through the substrate 12. One or more layers 34 of plural encapsulated liquid crystals 11 are applied and adhered directly to the electrode layer 33. Such adherence according to the preferred embodiment and best mode is effected by the encapsulating medium that forms respective capsules 22, although, if desired, as was mentioned above, an additional adhering or binding material may be used for such adherence purposes. The thickness of the layer 34 may be, for example, approximately 0.3 to 10 mils, preferably 0.5 to 4 mils, more preferably 0.5 to 1.2 mils, especially about 0.5 to about 0.7 mil. Other thicknesses may also be used, depending inter alia on the ability to form a thin film and the electrical breakdown properties of the film. A further electrode layer 35 is deposited on the layer 34 either directly to the material of which the capsules 22 are formed or, alternatively, to the additional binding material used to bind the individual encapsulated liquid crystals 11 to each other and to the mounting substrate 12. The electrode layer 35 may be, for example, approximately ½ mil thick and may be formed, for example, of electrically conductive ink or of the materials mentioned above for layer 33. A protective coating layer 36 for the purposes described above with respect to the coating 15 in FIG. 3 also may be provided as is shown in FIG. 4.

In a conventional visual display device either of the liquid crystal or light emitting diode type, the figure eight element 30 ordinarily would be divided into seven electrically isolated segments, each of which may be selectively energized or not so as to create various numeral characters. For example, energization of the segments 30a and 30b would display the numeral "1", and energization of the segments 30a, 30b, and 30c would display the numeral "7".

A feature of the present invention utilizing the encapsulated liquid crystals 11 is that a versatile substrate 12 can be created to be capable of displaying virtually any desired display as a function of only the selective segments of conductive ink electrodes printed on the liquid crystal material. In this case, the entire surface 31 of the substrate 12 may be coated with electrode material 33, and even the entire surface of that electrode material may be coated substantially contiguously with layer 34 of encapsulated liquid crystals 11. Thereafter, a prescribed pattern of electrode segments of conductive ink 35 may be printed where desired on the layer 34. A single electrical lead may attach the surface 31 to a voltage source, and respective electrical leads may couple the respective conductive ink segments via respective controlled switches to such voltage source.

Alternatively, the encapsulated liquid crystals 11 and/or the electrode material 33 may be applied to the surface 31 only at those areas where display segments are desired. The ability to apply encapsulated liquid crystal to only a desired area or plurality of areas such as the segments of a display by essentially conventional processes (such as e.g. silk-screening or other printing processes) is particularly attractive, when compared with the prior art, which has the problem of containing liquid crystals between flat plates. Moreover, the ability to connect electrically directly to the "back side" of the display since no support or protective layer may be needed, as was mentioned above, other than, for example, the substrate 12, further enhances the capabilities and versatility of a display or other device employing the invention hereof.

Exemplary conducting ink would be silver flake dispersed in a 20 percent solution of polyvinyl alcohol or other transparent binder. To 5 grams of 80/20 polyvinyl alcohol is added 5 grams of silver flake. The material is stirred to obtain an even dispersion. The ink is silk screen printable onto the back of the encapsulated liquid crystal material.

Although a detailed description of the operation of the individual encapsulated liquid crystals 11 will be presented below, it will suffice here to note that the encapsulated liquid crystals in the layer 34 may function to attenuate or not to attenuate light incident thereon in dependence on whether or not an electric field is applied thereacross. When the liquid crystal material is used in such an attenuating/non-attenuating mode, preferably a pleochroic dye is present in solution in the liquid crystal material to provide substantial attenuation by absorption in the "field-off" condition but to be substantially transparent in the "field-on" condition. Such an electric field may be, for example, one produced as a result of the coupling of the electrode layer portions 33, 35 at an individual segment, such as segment 30a, of the liquid crystal device 10' to an electrical voltage source. The magnitude of the electric field required to switch the encapsulated liquid crystals 11 from a no field (deenergized) condition to a field-on (energized) condition may be a function of several parameters, including, for example, the diameter of the individual capsules and the thickness of the layer 34, which in turn may depend on the diameter of individual capsules 22 and the number of such capsules in the thickness direction of layer 34. Importantly, it will be appreciated that since the liquid crystal material 20 is confined in respective capsules 22 and since the individual encapsulated liquid crystals 11 are secured to the substrate 12, the size of the liquid crystal device 10' or any other liquid crystal device employing encapsulated liquid crystals in accordance with the present invention is virtually unlimited. Of course, at those areas where it is intended to effect a change in the optical properties of the encapsulated liquid crystals of such a device in response to a no field or field on condition, it would be necessary to have at such areas electrodes or other means for applying to such liquid crystals a suitable electric field.

Briefly referring to FIG. 5, which shows an example of the abovementioned scattering device of application Ser. No. 477,138, succinctly stated, such embodiment relates to the isotropic scattering of light by liquid crystal material and to the use of such isotropically scattered light to yield a white or bright appearance, character, information, etc., especially relative to background, when a liquid crystal material is in a field-off or distorted alignment condition and a colored or dark appearance, e.g. the same as background, when a liquid crystal material is in field-on parallel or ordered alignment condition. Preferably the liquid crystal material is nearly completely isotropically scattering when in distorted alignment. Isotropic scattering means that when a beam of light enters the liquid crystal material there is virtually no way to predict the exit angle of scattered light. As used herein, "isotropic scattering" means complete isotropic scattering in a totally random or unpredictable way or at least a substantial or reasonable amount of scattering, this being as opposed to absorption of light.

As seen in FIG. 5, a liquid crystal display 40 can produce relatively bright or white characters, information, etc., on a relatively dark background; the bright character is produced by liquid crystal material that is randomly aligned; the background is caused, for example, by liquid crystal material that is in ordered alignment and, thus, substantially optically transparent and/or by areas of the display where there is no liquid crystal material. When the liquid crystal material is in parallel or ordered alignment, only the relatively dark background, e.g., formed by an absorber or by a dark foreground reflected by a reflector, would appear. The foregoing is accomplished using illumination either from the viewing side 41 or direction or from the back or non-viewing side 42 of the display. The principles of the invention also may be used in an optical shutter or light control device to control brightness, for example.

The liquid crystal apparatus (FIG. 5) includes liquid crystal material 34 for selectively primarily scattering or transmitting light in response to a prescribed input and a containment, encapsulating or support medium 12 for holding therein the liquid crystal material, thus volumes of liquid crystal are in the medium 12. The volumes of liquid crystal material may be considered encapsulated liquid crystal that will cause substantially isotropic scattering of light incident thereon, including the scattering of some of such light back in the viewing direction toward, for example, the eye of an observer. Such liquid crystal is operationally nematic, has a positive dielectric anisotropy, and has an ordinary index of refraction that substantially matches that of the medium 12.

In one embodiment, a large quantity of light that is isotropically scattered by the liquid crystal material is totally internally reflected in medium 12 back to the liquid crystal material thereby illuminating the same and causing further isotropic scattering and brightening of the appearance of the liquid crystal material, for example to the eye of an observer. The internal reflectance characteristic of the medium 12 may be effected by an interface with another medium 43, such as a solid, liquid, or gas, even including air, with the constraint that the index of refraction of the support medium is greater than the index of refraction of such other medium. The support medium may be comprised of several components, including, for example, the containment/encapsulating material (or that with which the liquid crystal material is in emulsion), additional quantities of such encapsulating or other material, a mounting medium, such as a plastic-like film or glass, etc.

The back surface 44 of the support medium 12 may be optically transmissive so that light that reaches such surface in a direction substantially normal thereto will be transmitted. A light absorbing black or colored material 45 beyond such back surface can help darken or color the apparent background on which the characters formed by liquid crystal material appear. Alternatively, as was mentioned above, a true reflector could be at or beyond, i.e. spaced from, the back surface of the support medium. Ordered alignment of the liquid crystal material will at least substantially eliminate the isotropic scattering so that substantially all the light passing through the liquid crystal material will also pass through the back surface of the support medium.

As is disclosed in application Ser. No. 477,138, in an alternate embodiment, a tuned dielectric coating may be applied, e.g. by evaporation techniques, to the back surface of the support medium to effect selective constructive and destructive optical interference. The thickness of such tuned dielectric coating will be a function of lambda ($\lambda$) divided by 2, lambda being the wavelength of light employed with the apparatus. Constructive interference will enhance the internal reflection, especially by reducing the solid angle within which light would not be totally internally reflected in the support medium; and, therefore, such interference will further brighten the appearance of the liquid crystal material characters.

It is significant to note that such an arrangement or pattern of encapsulated liquid crystal material layer portions, such as at 61L and 61R, separated at zone 62 by support medium 12 or other material is facilitated, or even made possible due to the encapsulating or confining of the liquid crystal in discrete containment media, such as is formed by the preferred stable emulsion. Therefore, especially on a relatively large size device such as a display, billboard, optical shutter, etc., encapsulated liquid crystal material may be applied to the support medium 12 only where it is required to provide the selectable optical characteristics. Such patterning of the encapsulated liquid crystal material can in some instances, then, appreciably reduce the amount of such material required for a particular application. Such patterning is further made possible consistent with desired operation of a device using encapsulated liquid crystal material in accordance with the invention due to the functional operation thereof as will be described in detail below.

The display 40 may be used, for example, in an air environment, such air being represented by the reference numeral 63, and the air forms an interface 64 at the viewing side or from the viewing direction 41 with the support medium 12. The index of refraction N of the external medium 63 is different from, usually smaller than, the index of refraction N' of the encapsulating and support medium 12. As a result, a beam of light 65, which arrives generally from the viewing direction 40, passing through the interface 64 into the support medium 12 will be bent toward the normal, which is an imaginary line 66 perpendicular to that interface 64. That light beam 65a inside the support medium 12 will be closer to normal than the incident beam 65 satisfying the equation relationship $N \sin \theta = N' \sin \theta'$, wherein $\theta$ is the angle of the incident light beam 65 with respect to the normal and $\theta$ is the angle of the light beam 65a with respect to normal. Such mathematical relationship will apply at the interface 66, as follows: $N' \sin \theta' = N'' \sin \theta''$. To achieve the desired total internal reflection in accordance with the invention, the index of refraction $N''$ of the reflectance medium 43 is smaller than the index of refraction $N'$ of the support medium 12. Accordingly, if the light beam 65a, for example, were able to and did pass through the interface 66, it would be bent away from the normal at the interface 66 to the angle $\theta''$ with respect to normal. Actually, since the light beam 65, 65a is not scattered off course by the liquid crystal material in layers 61, i.e., because it passes through the zone 62, it will indeed likely exit through the interface 66 as beam 65b for absorption by the absorber 45.

Continuing to refer particularly to FIG. 5, operation of a liquid crystal display 40 in accordance with the invention is now described. The operationally nematic liquid crystal 34 is in distorted or random alignment due to existence of a field-off condition. Incident light beam 70 enters the support medium 12 at the interface 64 and is bent as the light beam 70a that impinges as incident light on the layer 61L of encapsulated liquid crystal. The random or distorted encapsulated liquid crystal material will isotropically scatter the light incident thereon. Therefore, there are several possibilities of how such incident light beam 70a would tend to be scattered, as follows:

A. For example, one possibility is that the incident light beam 70a will be directed according to the dotted line 70b toward the interface 66. The angle at which the light beam 70b impinges on the interface 66 is within the illustrated solid angle $\alpha$ (defined in the planar direction of the drawing of FIG. 5 by the dashed lines 71) of a so-called cone of illumination. Light falling within such solid angle $\alpha$ or cone of illumination is at too small an angle with respect to normal at the interface 66 to be totally internally reflected at that interface; therefore, the light beam 70b will pass through interface 66 while bending away from the normal to form the light beam 70c. Light beam 70c passes into the reflectance medium 43 and is absorbed by layer 45.

B. Another possibility is that the light beam 70a will be isotropically scattered in the direction of the light beam 70d outside the cone angle $\alpha$. Total internal reflection will occur at the interface 66 causing the light beam 70d to be reflected as light beam 70e back to the layer 61L of encapsulated liquid crystal material where it will be treated as another independently incident light beam thereto, just like the light beam 70a from which it was derived. Therefore, such light beam 70e will undergo isotropic scattering again as is described herein.

C. Still another possibility is that the incident light beam 70a, or that derived therefrom, such as the light beam 70e, will be isotropically scattered toward the interface 64 at an angle that is so close to normal at that interface 64 that the light beam will pass through the interface 64 into the "medium" 63, such as the air, to be viewed by an observer or observing instrument. The solid angle $\alpha'$ of a cone of illumination, like the cone angle $\alpha$ mentioned above, within which such scattered light beam 70e must fall to be emitted out through the interface 64 is represented by the single dot phantom lines 72. Light beam 70f represents such a light beam that is so emitted from the display 60. It is that light, e.g. the sum of such emitted light beams 70f, which exits at the interface 64 that causes the layer 61 of encapsulated liquid crystals 11 to give the appearance of a white or bright character as viewed from the viewing direction 41.

D. Still a further possibility is that the light beam 70a may be isotropically scattered in the direction of the light beam 70g. Light beam 70g is outside the solid cone angle $\alpha'$ and, therefore, will undergo total internal reflection at the interface 64, whereupon the reflected beam 70h will impinge back on the layer 61L as an effectively independent incident light beam, like the beam 70e mentioned above and having a similar effect.

The index of refraction of the electrodes 13, 14 usually will be higher than that (those) of the containment medium and support medium and the containment and support media indices of refraction preferably are at least about the same. Therefore, the light passing from the containment medium into the electrode material will bend toward the normal, and that passing from the electrode into the support medium will bend away from the normal; the net effect of the electrode thus being nil or substantially negligible. Accordingly, the majority of total internal reflection will occur at the interfaces 64, 66.

As viewed from the viewing direction 41, the zone 62 will appear dark or colored according to the composition of the absorbent layer 45. This is due to the fact that the light beam 65, 65a, 65b, representing the majority of light that passes through zone 62, will tend to pass through interface 64, support medium 12, the interface 66 and the reflectance medium 43, being bent toward or away from the normal, at respective interfaces as shown, ultimately being substantially absorbed by layer 45.

In the field-on or ordered alignment condition and operation of the encapsulated liquid crystal layer 61 in the display device 60 the encapsulated liquid crystal 34 is optically transmissive. Therefore, like the light beam 65, 65a, 65b which passes through the zone 62 and is absorbed by the layer 45, a light beam 70, for example, transmitted through the aligned and, thus, effectively transparent or non-scattering layer 61 will pass through the interface 66 and will be absorbed by the layer 45, e.g. as is represented by beam 70c. Accordingly, whatever visual appearance the light beam 65 would tend to cause with respect to an observer at the viewing location 41, so too will the light beam 70 cause the same effect when passing through the orderly aligned encapsulated liquid crystal material. Thus, when the display 40, and particularly the encapsulated liquid crystal material therein, is in the orderly aligned or field-on condition, the area at which the liquid crystal is located will have substantially the same appearance as that of the zone 62.

It is noted that if either the incident beam 65 or 70 were to enter the support medium 12 at the interface 64 at such a large angle with respect to the normal there, and, therefore, ultimately to impinge on the interface 66 at an angle greater than one falling within the so-called cone of light angle $\alpha$, such beam would be totally internally reflected at the interface 66. However, such reflected light probably would remain within the support medium 12 due to subsequent transmission through the layer of liquid crystal material 61 and subsequent total internal reflectance at the interface 64, etc.

Incident illumination for a liquid crystal display embodying the invention may be from the front or viewing side. Alternatively, incident illumination may be from the back side, preferably through a mask or director to direct light fully transmitted by the liquid crystal material out of the field or angle of view at the viewing side, as also is disclosed in application Ser. No. 477,138. However, light scattered by the liquid crystal material within the viewing angle would be seen.

Moreover, a cholesteric material or a chiral additive may be added to the nematic liquid crystal material to expedite return of the latter to distorted alignment pattern following in general the configuration of the capsule or cell wall when the electric field is turned off, especially when the capsules are relatively large. Also, if desired, a viscosity controlling additive may be mixed with the liquid crystal. Further, an additive to the liquid crystal may be used to help force a preferred alignment of the liquid crystal structure in a capsule, for example, to the normal alignment of FIG. 10, which is described further below.

The electrode layer 13 (33 in FIG. 4) may be applied to the substrate 12 by evaporation, by vacuum deposition, by sputtering, by printing or by another conventional technique. Moreover, the layer 34 of encapsulated liquid crystals 11 may be applied, for example, by a web or gravure roller or by reverse roller printing techniques. The electrode layer 14 (35 in FIG. 4) also may be applied by various printing, stenciling or other techniques. If desired, the electrode layer 33 may be prepared as a full coating of the substrate 12, such as Mylar, as described above, as part of the process in which the Mylar sheet material is manufactured, and the layer 34 also may be applied as part of such manufacturing process.

The ability to make and to use successfully liquid crystal devices of the type just described using encapsulated liquid crystals is due to the ability to make encapsulated liquid crystals and to the properties of such encapsulated liquid crystals, both of which are features of the present invention.

Figure 7:
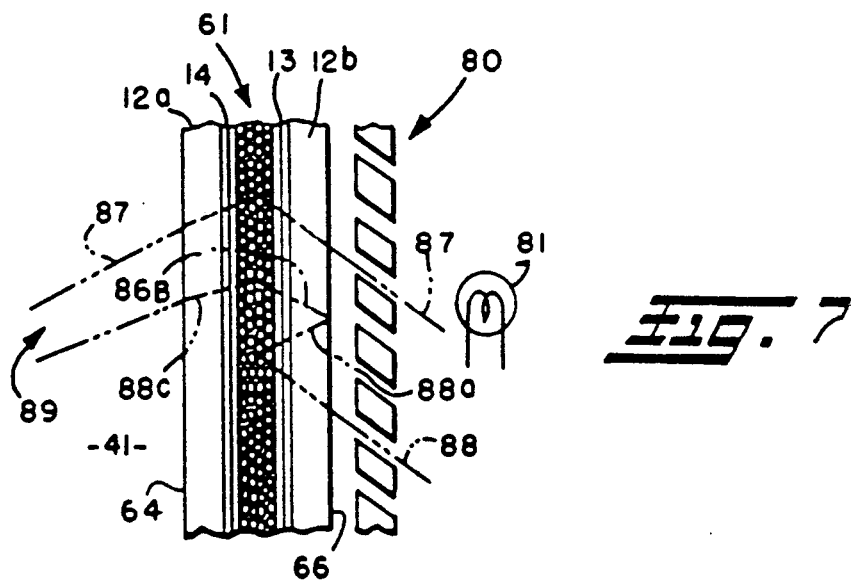

A liquid crystal display device 80 in accordance with the preferred embodiment and best mode of the present invention is shown schematically in FIGS. 6 and 7. In the device 80 the primary source of illumination is derived from a light source 81 at the so-called back or non-viewing side 82 of the display device. More specifically, the display device 80 includes a layer 61 of encapsulated liquid crystal between a pair of electrodes 13, 14 supported on upper and lower support media 12a, 12b. The reflectance medium 43 is an air gap.

A light control film (LCF) sold by 3-M Company is shown at 83; the one preferred is identified by product designation LCFS-ABRO-30°-OB-60°-CLEAR-GLOS-.030. The light control film 83 is a thin plastic sheet preferably of black substantially light absorbing material that has black micro-louvers 84 leading therethrough from the back surface 85 toward the front surface 86 thereof. Such film or like material may be used in connection with the various embodiments of the invention. Such film may in effect tend to collimate the light passing therethrough for impingement on the liquid crystal material.

The micro-louvers function like a venetian blind to direct light from the source 81, for example light beams 87, 88, into and through the display device 80, and particularly through the support medium 12 and liquid crystal layer 61, at an angle that would generally be out of the viewing angle line of sight of an observer looking at the display device 80 from the viewing direction 41—this when the liquid crystal is aligned or substantially optically transparent. Such field-on aligned condition is shown in FIG. 7 in which the light beams 87, 88 pass substantially through the display device 80 out of the line of view. Moreover, light, such as light beam 89, incident on the display device 80 from the viewing direction 41 will generally pass through the support medium 12 and aligned, field-on liquid crystal layer 61 for absorption by the black film 83, which functions as the absorber 45 in connection with FIG. 5, for example.

However, as is seen in FIG. 7, when the liquid crystal layer 61 is in the field-off condition, i.e. the liquid crystal is distorted or randomly aligned, the light beams 87, 88 from the source 81 are isotropically scattered by the layer of liquid crystal material 61 causing total internal reflection and brightened appearance of the liquid crystal material in the manner described above. Thus, for example, the beam 88 is shown being isotropically scattered as beam 88a, totally internally reflected as beam 88b, and being further isotropically scattered as beam 88c which is directed out through the interface 64 toward the viewing direction 41. The display device 80 of FIGS. 6, 7 is particularly useful in situations where it is desirable to provide lighting from the back or non-viewing side. However, such display device also will function in the manner described above even without the back light source 81 as long as adequate light is provided from the viewing direction 41. Therefore, the device 80 may be used in daylight, for example, being illuminated at one or both sides by ambient light with or without the light source 81, and at night or in other circumstances in which ambient lighting is inadequate for the desired brightness, for example, by using the illumination provided from the source 81.

Figure 8:
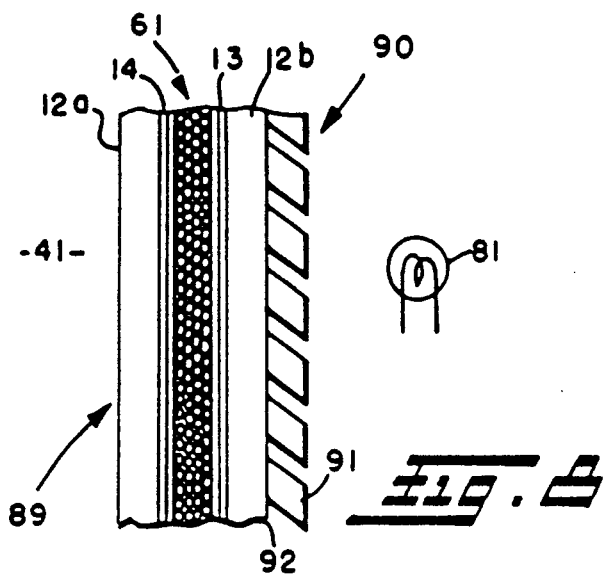
FIG. 8 is a schematic illustration similar to FIGS. 6 and 7 but with the light control film director cemented to the support medium.

A display device 90 in FIG. 8 is similar to the display device 80 except that the light control film 91 is cemented at 92 directly to, or is otherwise placed in abutment with the support medium material 12b. Total internal reflection would occur in the manner described above when the display device 90 is illuminated with light from the viewing direction 41 due primarily to the interface 64 of the support medium 12a with air. There also may be some total internal reflection at the interface 92. However, since the LCF film is directly applied to the support medium 12b, a relatively large quantity of the light reaching the interface 92 will be absorbed by the black film. Therefore, in the display device 90 it is particularly desirable to supply a back lighting source 81 to assure adequate illumination of the liquid crystal material in the layer 61 for achieving the desired bright character display function in accordance with the invention.

Figure 9:
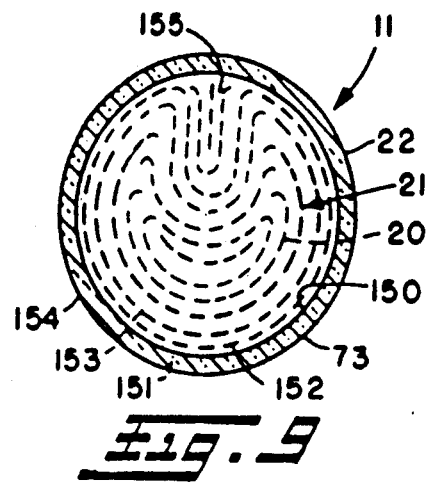
FIG. 9 is an enlarged schematic illustration of a liquid crystal capsule in accordance with the present invention under a no-field condition.

Referring specifically to FIG. 9, the capsule 22 has a generally smooth curved interior wall surface 150 defining the boundary of the volume 21. The actual dimensional parameters of the wall surface 150 and of the overall capsule 22 are related to the quantity of liquid crystal material 20 contained therein. Additionally, the capsule 22 applies a force to the liquid crystals 20 tending to pressurize or at least to maintain substantially constant the pressure within the volume 21. As a result of the foregoing, and due to the surface wetting nature of the liquid crystal, the structure which ordinarily in free form would tend to be straight, although perhaps randomly distributed, is distorted to curve in a direction that generally is parallel to a relatively proximate portion of the interior wall surface 150. Due to such distortion the liquid crystals store elastic energy. For simplicity of illustration, and for facility of comprehending the foregoing concept, a layer 151 of liquid crystal molecules whose directional orientation is represented by respective dashed lines 152 is shown in closest proximity to the interior wall surface 150. The use herein of the word "molecules" is intended to be synonymous with liquid crystal "structure" since it often is the case in the art that it is the arrangement and/or configuration of the structure of the liquid crystal that has particular meaning and operational effect. Exemplary undistorted structure would be straight for operationally nematic liquid crystal. The directional orientation of the molecules or structure 152 is distorted to curve in the direction that is parallel to a proximate area of the wall surface 150. The directional pattern of the liquid crystal molecules away from the boundary layer 152 within the capsule is represented by dashed lines 153. The liquid crystal molecules are directionally represented in such layers, but it will be appreciated that the liquid crystal molecules themselves are not confined to such layers. Thus, the organization in an individual capsule is determined by the organization of the structure 152 at the surface 150 of the capsule or volume defining wall 154 and is fixed unless acted on by outside forces, e.g. an electric field. On removal of the field, the directional orientation would revert back to the original orientation such as that shown in FIG. 9.

In the preferred embodiment and best mode of the present invention the liquid crystal molecules 152 are of the nematic or operationally nematic type and have positive dielectric anisotropy. Such molecules or liquid crystal structure usually assume(s) a straight line configuration, and a liquid crystal material comprised of such nematic molecules usually is optical polarization direction sensitive. However, since the structure 152 in the encapsulated liquid crystal 11 is distorted or forced to assume a curved form in the full three dimensions of the capsule 22, such nematic liquid crystal material in such capsule takes on an improved characteristic of being insensitive to the direction of optical polarization of light incident thereon. The inventor has discovered, moreover, that when the liquid crystal material 20 in the capsule 22 has pleochroic dye dissolved therein, such dye, which ordinarily also would be expected to have optical polarization sensitivity, no longer is polarization sensitive because the dye tends to follow the same kind of curvature orientation or distortion as that of the liquid crystal structure.

It is noted here that the liquid crystal material 20 in the capsule 22 has a discontinuity 155 in the generally spherical orientation thereof. Such discontinuity is caused by the inability of the liquid crystal to align uniformly in a manner compatible with parallel alignment with the wall 154 and a requirement for minimum elastic energy. The liquid crystal will, however, tend to follow around the discontinuity in the manner shown in planar form in FIG. 9, but in reality in three dimensions, following a pattern along the three dimensional generally spherical internal boundary wall surface 150 of the protruding discontinuity 155. Such discontinuity further distorts the liquid crystal structure which in turn further decreases the possibility that the liquid crystal material 20 would be sensitive to the optical polarization of the incident light.

With the liquid crystal structure being distorted to fold in on itself generally in the manner illustrated in FIG. 9, the encapsulated liquid crystal 11 ordinarily will absorb or block light from being transmitted therethrough when no electric field is applied across the encapsulated liquid crystal 11 and particularly across the liquid crystal material 20 thereof.

Although the foregoing discussion has been in terms of a homogeneous orientation of the liquid crystal material (parallel to the capsule wall), such is not a requisite of the invention. All that is required is that the interaction between the wall and the liquid crystal produce an orientation in the liquid crystal near that wall that is generally uniform and piecewise continuous, so that the spatial average orientation of the liquid crystal material over the capsule volume is strongly curved and there is no substantial parallel directional orientation of the liquid crystal in the absence of an electric field. It is this strongly curved orientation that results in the absorption/scattering and polarization insensitivity in the field off condition, which is a feature of this invention. Thus, the normal alignment configuration of FIG. 10 also supplies such operational characteristics.

Figure 10:
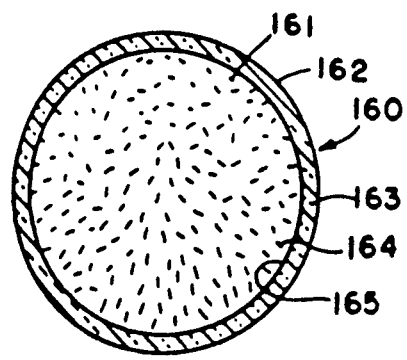
FIG. 10 is a schematic illustration like FIG. 9, for example, but showing alignment of the liquid crystal structure normal to the capsule wall.

Briefly referring to FIG. 10, there is shown an alternate embodiment of encapsulated liquid crystal material 160, which may be substituted for the various other embodiments of the invention disclosed herein. The encapsulated liquid crystal material 160 includes operationally nematic liquid crystal material 161 in a capsule 162 having preferably a generally spherical wall 163. In FIG. 10 the material 160 is in field-off condition, and in that condition the structure 164 of the liquid crystal molecules is oriented to be normal or substantially normal to the wall 163 at the interface 165 or surface thereof. Thus, at the interface 165 the structure 164 is generally oriented in a radial direction with respect to the geometry of the capsule 162. Moving closer toward the center of the capsule 162, the orientation of the structure 164 of at least some of the liquid crystal molecules will tend to curve in order to utilize, i.e. to fill, the volume of the capsule 162 with a substantially minimum free energy arrangement of the liquid crystal in the capsule, for example, as is seen in the drawing.

Such alignment is believed to occur due to the addition of an additive to the liquid crystal material 161 which reacts with the support medium to form normally oriented steryl or alkyl groups at the inner capsule wall. More particularly, such additive may be a chrome steryl complex or Werner complex that reacts with PVA of the support medium (12) that forms the capsule wall 163 to form a relatively rigid crust or wall with a steryl group or moeity tending to protrude radially into the liquid crystal material itself. Such protrusion tends to effect the noted radial or normal alignment of the liquid crystal structure. Moreover, such alignment of the liquid crystal material still complies with the above strongly curved distortion of the liquid crystal structure in field-off condition because the directional derivatives taken at right angles to the general molecular direction are nonzero.

Figure 11:
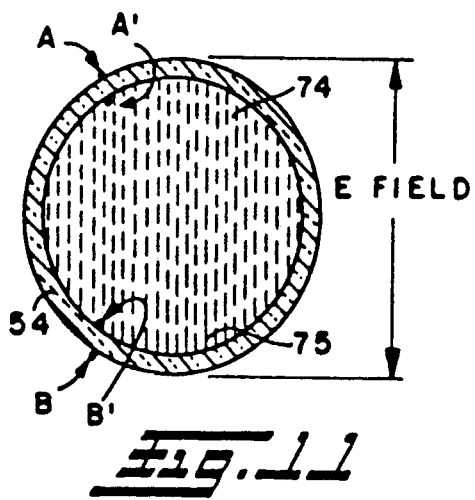
FIG. 11 is a view similar to FIG. 9 under an applied electric field condition.

When an electric field is applied across the encapsulated liquid crystal 11, whether of the parallel or normal relative to the capsule walls arrangements of FIGS. 9 or 10, in the manner illustrated in FIG. 11, the liquid crystal and any pleochroic dye in solution therewith will align in response to the electric field in the manner shown in such figure. Such alignment results in a reduction of light attenuation by the liquid crystal; indeed such alignment preferably permits light to be transmitted through the encapsulated liquid crystal 11.

In the field off condition, since the liquid crystal structure is distorted to a curved form (hereinafter curvilinearly aligned form), the structure has a certain elastic energy. Such elastic energy causes the crystals to function to do things that otherwise would not be possible when the liquid crystal structure assumes its ordinary linear form. For example, the discontinuity protrusion 155 (FIG. 9) tends to cause scattering and absorption within the capsule, and the tangential or parallel alignment of the liquid crystal molecules to respective portions of interior wall surface 150 both cause scattering and absorption within the capsule 22. On the other hand, when the electric field is applied in the manner illustrated in FIG. 11, not only does the liquid crystal align as shown, but also the discontinuity 155 tends to vanish, being dominated by the electric field. Accordingly, such discontinuity will have a minimum effect on optical transmission when the encapsulated liquid crystal 11 is in a field on condition.

To optimize the contrast characteristics of a liquid crystal device, such as that shown at 10' in FIG. 3 or at 40 in FIG. 5, comprised of encapsulated liquid crystals 11, and more particularly, to avoid optical distortion, due to refraction of incident light passing from the encapsulating medium into the liquid crystal material and vice versa, of the encapsulated liquid crystal 11 of FIG. 9, the index of refraction of the encapsulating medium and that the ordinary index of refraction of the liquid crystal material should be matched so as to be as much as possible the same. The closeness of the index matching will be dependent on the desired degree of contrast and transparency in the device, but the ordinary index of refraction of the crystal and the index of the medium will preferably differ by no more than 0.07, more preferably 0.01, especially 0.001. The tolerated difference will depend on capsule size and intended use of the device. The text "Optics" by Sears, published by Addison-Wesley, contains a thorough discussion of birefringence relevant to the foregoing, and the relevant portions of such text are incorporated herein by reference.

However, when no field is applied there will be a difference in indices of refraction at the boundary of the liquid crystal and capsule wall due to the extraordinary index of refraction of the liquid crystal being greater (in any event different) than the encapsulating medium. This causes refraction at that interface or boundary and thus further scattering, preferably isotropic scattering, and is a reason why encapsulated nematic liquid crystal material in accordance with the present invention, in particular, will function to prevent transmission of light even without the use of pleochroic dye. Indeed, such scattering in field off curvilinearly aligned condition of the liquid crystal material enables output of a bright character on a dark background in the scattering embodiment 40 of FIG. 5.

Ordinarily the encapsulated liquid crystals 11 would be applied to the substrate 12 (FIG. 3) such that the individual encapsulated liquid crystals 11 are relatively randomly oriented and preferably several capsules thick to assure an adequate quantity of liquid crystal material on the surface 31 of the substrate to thereby provide the desired level of light blockage, scattering, and/or transmission characteristics for, for example, a liquid crystal device 10' or the like.

In a liquid crystal device, such as that shown at 10' in FIG. 3, which is comprised of liquid crystal material 20 including pleochroic dye to form encapsulated liquid crystals 11 according to the invention, it has been discovered that the degree of optical absorbency is at least about the same as that of relatively free (unencapsulated) liquid crystal material, including pleochroic dye such as that shown in FIG. 1. It also has been discovered unexpectedly that when the electric field is applied in the manner illustrated in FIG. 11, for example, the clarity or lack of opaqueness of the encapsulated liquid crystal material 20 including pleochroic dye is at least about the same as that of the ordinary case in the prior art device 1 having dye in solution with relatively free liquid crystal material.

It is important that electrical field E shown in FIG. 11 is applied to the liquid crystal material 20 or 160 in the capsule 22 or 162 (FIGS. 9 and 10) for the most part rather than being dissipated or dropped substantially in the encapsulating material of which the capsule itself is formed. In other words, it is important that there not be a substantial voltage drop across or through the material of which the wall 154 of the capsule 22 is formed, for example; rather, the voltage drop should occur predominantly across the liquid crystal material 20 within the volume 21 of the capsule 22.

The electrical impedance of the encapsulating medium preferably should in effect be sufficiently larger than that of the liquid crystal material in the encapsulated liquid crystal 11 (FIG. 11) so that a short circuit will not occur exclusively through the wall 154, say from point A via only the wall to point B, bypassing the liquid crystal material. Therefore, for example, the effective impedance to induced or displacement current flow through or via the wall 154 from point A only via the wall 154 to point B, should be greater than the impedance that would be encountered in a path from point A to point A' inside the interior wall surface 50, through the liquid crystal material 20 to point B' still within the volume 21, thence ultimately to point B again (this may be considered, for example, the lumped impedance of the liquid crystal material and the smaller amount of medium, i.e. relative to the larger amount of medium in the aforementioned direct A-B path exclusively through the medium, in an electrical path directly from one electrode, through medium, e.g. on side of a capsule wall, through the liquid crystal material, through medium again, e.g. the diametrically opposite side of the capsule wall, and to the electrode. Thus, referring to FIG. 11 the electrical path through only one medium may be referred to as the medium path or A-B path; the electrical path through only liquid crystal material may be referred to as the liquid crystal path or A'-B' path; the electrical path through the thinner medium portions primarily between liquid crystal material and the electrodes, e.g. the capsule wall, may be referred to as the wall thickness path or A-A' or B-B' path; and the electrical path between electrodes and through both medium and liquid crystal material may be referred to as the lumped impedance path or the A-A'-B'-B path. This condition will ensure that there will be a potential difference between point A and point B, which should be large enough to produce an electric field across the liquid crystal material that will tend to align it. It will be appreciated that due to geometrical considerations, namely the length through only the wall from point A to point B, for example, that such a condition can still be met even though the actual impedance of the wall material may be lower than that of the liquid crystal material contained therein.

The dielectric constant of the material of which the encapsulating medium is formed and the dielectric coefficients of which the liquid crystal material is comprised and the effective capacitance values of the capsule wall 154, particularly in a radial direction, and of the liquid crystal material across which the electric field E is imposed should all be so related that the wall 154 of the capsule 22 does not substantially decrease the magnitude of the applied electric field E. Ideally the capacitance dielectric constants of the entire layer 34 (FIG. 4) of encapsulated liquid crystal material should be substantially the same in the field-on condition.

Figure 12:
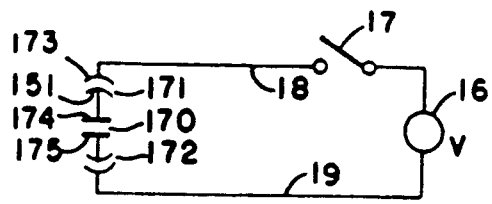
FIG. 12 is a schematic electric circuit diagram representation of the capsule with an applied field.

A schematic electric circuit diagram representing the circuit across which the electric field E of FIG. 11 is imposed is illustrated in FIG. 12. The electric field is derived from the voltage source 16 when the switch 17 is closed. A capacitor 170 represents the capacitance of the liquid crystal material 20 in the encapsulated liquid crystal 11 when such electric field is applied in the manner illustrated in FIG. 11. The capacitor 171 represents the capacitance of the wall 154 of the capsule 22 at an upper area (the direction conveniently referring to the drawing but having no other particular meaning) and is, accordingly, curved in a manner similar to that of the upper portion of the capsule 22, 162 of FIGS. 9, 10 and 11. The capacitor 172 similarly represents the capacitance of the lower portion of the capsule exposed to the electric field E. The magnitudes of capacitance for each capacitor 170-172 will be a function of the dielectric constant (coefficient) of the material of which the respective capacitors are formed and of the spacing of the effective plates thereof. It is desirable that the voltage drop occurring across the respective capacitors 171, 172 will be less than the voltage drop across the capacitor 170; the result, then, is application of a maximum portion of the electric field E across the liquid crystal material 20 in the encapsulated liquid crystal 11 for achieving optimized operation, i.e. alignment, of the liquid crystal molecules thereof with a minimum total energy requirement of the voltage source 16. However, it is possible that the voltage drop in one or both capacitors 171, 172 will exceed the voltage drop across capacitor 170; this is operationally acceptable as long as the drop across the capacitor 170 (liquid crystal material) is great enough to produce an electric field that tends to align the liquid crystal material to and/or toward the field-on condition of FIG. 11.

In connection with capacitor 171, for example, the dielectric material is that of which the wall 154 is formed relatively near the upper portion of the capsule 22. The effective plates of such capacitor 171 are the exterior and interior wall surfaces 173, 151, and the same is true for the capacitor 102 at the lower portion of the capsule 22 relative to the illustration of FIG. 11, for example. By making the wall 154 as thin as possible, while still providing adequate strength for containment of the liquid crystal material 20 in the volume 21, the magnitudes of capacitors 171, 172 can be maximized, especially in comparison to the rather thick or lengthy distance between the upper portion 174 of the liquid crystal material 20 of the lower portion 175 thereof which approximately or equivalently form the plates of the same number of the capacitor 170.

The liquid crystal material 20 will have a dielectric constant value that is anisotropic and, therefore, such characteristic may be more accurately referred to herein as a dielectric coefficient. It is preferable that the dielectric constant of the wall 154 be no lower than the lower dielectric coefficient of the anisotropic liquid crystal material 20 to help meet the above conditions. Since a typical lower dielectric constant for liquid crystal material is about 6, this indicates that the dielectric constant of the encapsulating material is preferably at least about 6. Such value can vary widely depending on the liquid crystal material used, being, for example, as low as about 3.5 and as high as about 8 in the commonly used liquid crystals.

The encapsulated liquid crystal 11 with pleochroic dye therein has features such that since the liquid crystal structure is curvilinearly aligned and since the pleochroic dye similarly is configured, absorbency or blockage of light transmission through the encapsulated liquid crystals will be highly effective when no electric field E is applied thereacross. On the other hand, due both to the efficient application of an electric field across the liquid crystal material 20 in the encapsulated liquid crystals 11 to align the liquid crystal structure and the dye along therewith as well as the above described preferred index of refraction matching, i.e. of the encapsulating medium and of the liquid crystal material, so that incident light will not be refracted or bent at the interface between the capsule wall 154 and the liquid crystal material 20 when an electric field is applied, the encapsulated liquid crystal 11 will have a good optically transmissive characteristic.

Since a plurality of encapsulated liquid crystals 11 ordinarily is required to construct a final liquid crystal device, such as the device 10' of FIG. 3, and since those encapsulated liquid crystals are ordinarily present in several layers, it is desirable for the liquid crystal material to have a relatively high dielectric anisotropy in order to reduce the voltage requirements for the electric field E. More specifically, the differential between the dielectric coefficient for the liquid crystal material 20 when no electric field is applied which coefficient should be rather small, and the dielectric coefficient for the liquid crystal material when it is aligned upon application of an electric field, which coefficient should be relatively large, should be as large as possible consistent with the dielectric constant of the encapsulating medium.

Figure 13A:
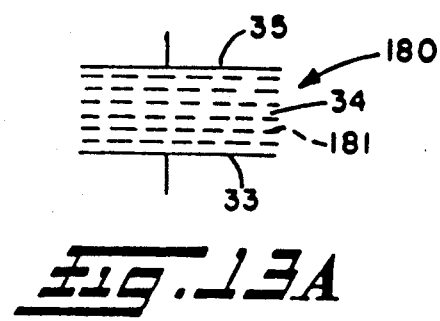
FIGS. 13A and 13B are schematic representations of a capacitor formed by the electrodes and layer of encapsulated liquid crystal material of FIG. 4.
Figure 13B:
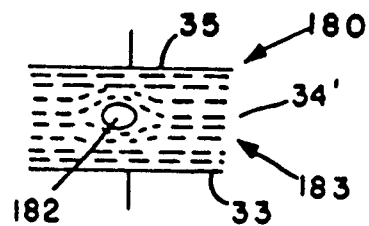

Turning to FIGS. 13A, 13B, 14A and 14B, to optimize operation of a liquid crystal device employing the encapsulated liquid crystals of the present invention, several electrically related criteria should be met. A capacitor is created, in effect, by the pair of electrodes 33, 35 and the layer of crystal material 34 therebetween. Such capacitor is represented at 180 in FIGS. 13A and 13B. It is desirable that the extraordinary dielectric coefficient of the liquid crystal material, i.e. in the presence of an electric field, equal the dielectric constant of the containment medium so that the effective dielectric constant type value of the layer 34 between the electrodes 33, 35 in the simulated capacitor 180 (FIG. 13A) is substantially uniform. Therefore, the field lines 111 will be flat, as is seen in FIG. 13A. On the other hand, if such maximum or extraordinary dielectric coefficient of the liquid crystal material were different from the dielectric constant of the containment means, then the overall dielectric constant type value of the layer 34' (FIG. 13B) would not be uniform. For example, one area of nonuniformity due to liquid crystal material 182 having a dielectric coefficient different from the containment medium is shown in FIG. 13B. The liquid crystal material 182 would cause distortion of the field lines 183, as is shown in FIG. 13B. Such distortion will decrease the uniformity of optical and electrical response of an encapsulated liquid crystal device and, thus, decrease the optimum desired operation thereof.

The reason that it is desirable for the extraordinary dielectric coefficient of the liquid crystal to equal to dielectric constant of the containment medium is to achieve maximum transmission in the field-on condition and to avoid distortion of the light passing through the encapsulated liquid crystal material. If such dielectric coefficients and constants were not equal, then the liquid crystal material may not be aligned directly with the electric field to the distortion of the field lines, and, therefore, such lack of alignment may result in distortion of the light passing therethrough.

It also is desirable that the ordinary dielectric coefficient (in the absence of an electric field) of the liquid crystal material be less than the extraordinary dielectric coefficient. This characteristic is achieved when the liquid crystal material has positive dielectric anisotropy. Furthermore, to facilitate the operation of the invention, as was described above, the dielectric constant of the containment medium should be greater than the ordinary dielectric coefficient of the liquid crystal material.

Desirably the maximum voltage drop occur across the liquid crystal material, and, therefore, it is desirable that the liquid crystal material have a relatively maximum impedance to assure such voltage drop thereacross.

Figure 14A:
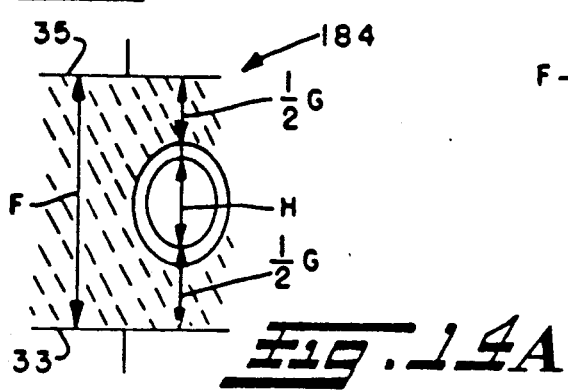
FIGS. 14A and 14B represent schematically paths between the plates of the capacitor of FIG. 10A and the equivalent circuits for respective paths.
Figure 14B:
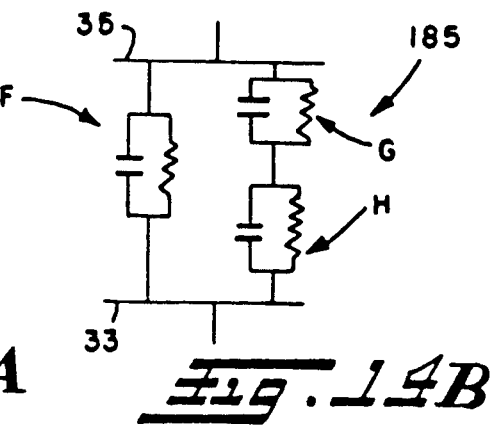

In FIGS. 14A and 14B effective impedances for a capacitor 184 are represented. For example, in the capacitor 184 of FIG. 14A between the capacitor plates 33, 35 (electrodes of FIG. 4) there is a path, e.g. an impedance path, identified F which exclusively is through the containment medium material. On the other hand, a different path is that which proceeds through containment medium material and liquid crystal material; such path is represented by the letters G for the containment medium on opposite sides of the liquid crystal material, the path through which is represented by the letter H. The capacitor 184 is converted to an equivalent circuit 185 in FIG. 14B, where the parallel resistor and capacitor circuit identified by the letter F represents the equivalent circuit between the capacitor plates 33, 35 through the path F exclusively of containment medium in FIG. 11A, and the resistor and capacitor circuits identified by the letters G, H represent the equivalent circuits along a path from plate 33, via containment medium (½ G), liquid crystal (H), and containment medium (½ G), to the other plate 35.

Consistent with the parameters outlined above, the effective impedance of the containment medium represented by $X_H$ should be greater than the effective impedance of the liquid crystal material $X_G$ along a path between the capacitor plates 33, 35 through containment medium and liquid crystal. To avoid short circuits exclusively through the containment medium, $X_F$, should be greater or equal to the sum of impedances $X_G$ and $X_H$.

It also is desirable that the encapsulated liquid crystal material comprise more than 50% by volume of liquid crystal material to achieve the above characteristics and to optimize operation both electrically and optically.

Summarizing the above mathematically:
(1) $\epsilon$ extraordinary = $\epsilon$ containment medium
 (Equivalence is most desirable.)
(2) $\epsilon$ ordinary < $\epsilon$ extraordinary
 (Therefore, positive dielectric anisotropy.)
(3) $\epsilon$ containment medium > $\epsilon$ ordinary
(4) Maximize $\Delta V_{LC}$, Maximize $X_H$
(5) $X_F \geq X_G + X_H$
 (Equivalence is most desirable.)
(6) $X_H > X_G$
(7) >50% volume LC The capsules 22 may be of various sizes. The smaller the capsule size, though, the higher the requirements will be for the electric field to effect alignment of the liquid crystal molecules in the capsule. Also, when the capsule size is relatively small, more capsules are required per unit area of the layer 34, and, therefore, more electric voltage drop losses will occur in the encapsulating medium than for larger size capsules, the density per unit area of which would be smaller. According to a preferred embodiment and best mode of the present invention, a device made with the encapsulated liquid crystals 11, such as the liquid crystal device 10' (e.g. FIG. 3), should use capsules of uniform size so that the device 10' can be energized or deenergized in a relatively uniform and well controlled manner. In contrast, when the capsules are of a non-uniform size, then nonuniform energization of the respective capsules, i.e. alignment of the liquid crystal molecules of each, would occur upon application of the electric field. Ordinarily the capsules 22 should have a size on the order of from about 0.5 micron to about 30 microns and more preferably about 1 to about 5 microns in diameter but larger and/or smaller capsules may be used.

The larger the capsule size, the smaller the electric field required to effect alignment of the liquid crystal molecules therein. However, the larger the sphere, the longer the response time. A person of ordinary skill in the art should have no difficulty, having regard to this disclosure, in determining a suitable or optimum capsule size for a given application.

Currently a preferred liquid crystal material is nematic material the 40% material below. Other liquid crystal materials may be esters or mixtures thereof, biphenyls or mixtures thereof, and the like, such as E-7, E-11, E-63, ZLI-2344, and ZLI-2392, as supplid by E. Merck Chemicals, Darmstadt, West Germany. Four formulations or recipes of exemplary liquid crystal materials useful according to the invention are, as follows:

| 10% Material | |
|---|---|
| Pentylphenylmethoxy Benzoate | 54 grams |
| Pentylphenylpentyloxy Benzoate | 36 grams |
| Cyanophenylpentyl Benzoate | 2.6 grams |
| Cyanophenylheptyl Benzoate | 3.9 grams |
| Cyanophenylpentyloxy Benzoate | 1.2 grams |
| Cyanophenylheptyloxy Benzoate | 1.1 grams |
| Cyanophenyloctyloxy Benzoate | 0.94 grams |
| Cyanophenylmethoxy Benzoate | 0.35 grams |
| 20% Material | |
| Pentylphenylmethoxy Benzoate | 48 grams |
| Pentylphenylpentyloxy Benzoate | 32 grams |
| Cyanophenylpentyl Benzoate | 5.17 grams |
| Cyanophenylheptyl Benzoate | 7.75 grams |
| Cyanophenylpentyloxy Benzoate | 2.35 grams |
| Cyanophenylheptyloxy Benzoate | 2.12 grams |
| Cyanophenyloctyloxy Benzoate | 1.88 grams |
| Cyanophenylmethoxy Benzoate | 0.705 grams |
| 40% Material | |

-continued

| | | |
|---|---|---|
| Pentylphenylmethoxy Benzoate | 36 | grams |
| Pentylphenylpentyloxy Benzoate | 24 | grams |
| Cyanophenylpentyl Benzoate | 10.35 | grams |
| Cyanophenylheptyl Benzoate | 15.52 | grams |
| Cyanophenylpentyloxy Benzoate | 4.7 | grams |
| Cyanophenylheptyloxy Benzoate | 4.23 | grams |
| Cyanophenyloctyloxy Benzoate | 3.76 | grams |
| Cyanophenylmethoxy Benzoate | 1.41 | grams |
| 40% MOD | | |
| Pentylphenylmethoxy Benzoate | 36 | grams |
| Pentylphenylpentyloxy Benzoate | 24 | grams |
| Cyanophenylpentyl Benzoate | 16 | grams |
| Cyanophenylheptyl Benzoate | 24 | grams |

The encapsulating medium forming capsules 22 should be of a type that is substantially completely unaffected by and does not react with or otherwise chemically affect the liquid crystal material. In particular, the liquid crystal material should not be soluble in the encapsulating medium or vice versa. The other characteristics described above concerning dielectric constants and/or coefficients and indices of refraction with respect to the liquid crystal material and to the encapsulating medium also constrain material selection. Moreover, when a pleochroic dye is employed, the encapsulating medium also should be unaffected by and should not affect the dye material. On the other hand, the dye should be soluble in the liquid crystal material and not subject to absorption by the encapsulating medium. Additionally, to achieve the desired relatively high impedance for the encapsulating medium, such medium should have a relatively high level of purity. Especially when the encapsulating medium is prepared as an aqueous dispersion or by ionic polymerization, etc., it is important that the level of ionic (conductive) impurities should be as low as possible.

Examples of pleochroic dyes that may suitably be used in the encapsulated liquid crystals 11 in accordance with the present invention are indophenol blue, Sudan black B, Sudan 3, and Sudan 2, and D-37, D-43 and D-85 by E. Merck identified above.

Various resins, gelatin, and/or polymers may be used as the encapsulating medium. Examples and properties are in the following Table A.

TABLE A

| High Dielectric Constant Polymers | | | |
|---|---|---|---|
| Polymer | Dielectric Constant | Refractive Index | Clarity |
| Cyanoethyl cellulose | 13 | | |
| Cotton | 6–18 | | |
| Acrylonitrile butadiene rubbers | 11–12 | 1.52 | Clear |
| Phenolics | 5.5–10.8 | 1.47–1.70 | |
| Melamine formaldehyde | 6.2–11 | | |
| Polyvinyl alcohol | 3.5–10 | 1.49–153 | Clear |
| Polyvinyl fluoride | 6.4–8.4 | 1.42 | Clear to opaque |
| Phenol formaldehyde | 4–8 | 1.47–1.70 | Clear to opaque |
| Cellulose acetate | 3.5–7.5 | 1.48–1.50 | Clear to opaque |
| Melamine phenolic | 7.1–7.6 | | |
| Polyvinyl chloride | 4.0–8.6 | 1.54–1.55 | Clear |
| Urethane elastomers | 5.6–7.6 | | Clear to opaque |
| Cast Urethane | 4.0–7.5 | 1.5–1.6 | Clear to opaque |
| Cellulose nitrate | 6.4–7.5 | 1.50–1.51 | Clear to opaque |
| Regenerated cellulose | 7.7 | | |
| Chlorosulphonated polyethylene | 6.7 | | |

TABLE A-continued

| High Dielectric Constant Polymers | | | |
|---|---|---|---|
| Polymer | Dielectric Constant | Refractive Index | Clarity |
| Polyacrylonitrile | 6.5 | 1.52 | Clear |
| Cellulose acetate butyrate | 3.5–6.4 | 1.46–1.49 | Clear to opaque |
| Nylon 12 | 3.6–7.0 | | Opaque |
| Polyester | 2.8–7.0 | 1.56 | Clear to opaque |
| Urea formaldehyde | 6.6–6.8 | 1.54–1.56 | |
| Polyphenylene sulfide | 6.2–6.6 | | |
| Alkyd | 5.7–6.6 | | Opaque |
| Epoxy | 3.5–6.7 | 1.55–1.60 | Clear |

However, an encapsulating medium according to a preferred embodiment and best mode of the present invention when the encapsulation is performed by emulsification is polyvinyl alcohol (PVA), which has been found to have the desired properties mentioned above, especially in relation to the above described preferred liquid crystal and pleochroic dye maerial. Specifically, PVA has a good, relatively high, dielectric constant and has an index of refraction that is relatively closely matched to that of the preferred liquid crystal material. Gelatin is another example of a useful encapsulating or containment medium.

To purify PVA, the same may be dissolved in water and washed out with alcohol using a precipitation technique. Other techniques also may be used for purifying PVA so that it will have minimum salt or other content that would reduce appreciably the electrical impedance thereof. The preferred purified PVA is Gelvatol sold by Monsanto. If PVA is properly purified, as aforesaid, it will serve well as its own emulsifier and as a wetting agent for facilitating the manufacture of encapsulated liquid crystals according to this method which will be described below. Other types of encapsulating medium may be, for example, gelatin; Carbopole (a carboxy polymethylene polymer of B. F. Goodrich Chemical Corporation); Gantrez (polymethyl vinyl ether/maleic anhydride) of GAF Corporation, preferably reacted with water to form the acid, the latter two being polyelectrolytes; and these media may be used alone or in combination with other polymers, such as PVA.

Other examples and characteristics of several PVA materials are shown in Table I.

TABLE I

| CONTAINMENT MEDIUM (PVA) | VISCOSITY | % HYDROLYZED | MOLECULAR Wgt. | TEMPERATURE & % SOLUTIONS |
|---|---|---|---|---|
| 20-30 Gelvatol, by Monsanto Company | 4–6 CPS | 88.7–85.5 | 10,000 | 4% at 20° C. |
| 40-20 Gelvatol, by Monsanto Company | 2.4–3 CPS | 77–72.9 | 3,000 | 4% at 20° C. |
| 523 Air Products and Chemicals, Inc. | 21–25 | 87–89 | — | 4% at 20° C. |
| 72-60 Elvanol, by DuPont Company | 55–60 | 99–100 | — | 4% at 20° C. |
| 405 Poval, by | 2–4 CPS | 80–82 | — | 4% at 20° C. |

TABLE I-continued

| CONTAINMENT MEDIUM (PVA) | VISCOSITY | % HYDROLYZED | MOLECULAR Wgt. | TEMPERATURE & % SOLUTIONS |
|---|---|---|---|---|
| Kurashiki | | | | |

The wetting ability of the PVA with respect to the liquid crystal material in the respective capsules 22, facilitates the preferred parallel alignment especially at the interior wall surface 150 in the field off condition and changing to the aligned position of FIG. 9 when an electric field is applied.

An emulsion method for making encapsulated liquid crystals 11 may include mixing together the encapsulating medium, the liquid crystal material (including, if used, the pleochroic dye material), and perhaps a carrier medium, such as water. Mixing may occur in a variety of mixer devices, such as a blender, a colloid mill, which is most preferred, or the like. What occurs during such mixing is the formation of an emulsion of the ingredients, which subsequently can be dried eliminating the carrier medium, such as water, and satisfactorily curing the encapsulating medium, such as the PVA. Although the capsule 22 of each thusly made encapsulated liquid crystal 11 may not be a perfect sphere, each capsule will be substantially spherical in configuration because a sphere is the lowest free energy state of the individual droplets, globules or capsules of the emulsion, both when originally formed and after drying and/or curing has occurred.

It is noted here briefly that the characteristic of the pleochroic dye that it must be soluble in the liquid crystal material and that it not be subject to absorption by the water phase or polymer phase assures that such pleochroic dye will not be absorbed by the PVA or other encapsulating medium or by the carrier medium, such as the water, used during the manufacturing process for the encapsulated liquid crystals 11.

EXAMPLE 1

A 0.45% Sudan black B pleochroic dye was dissolved in a liquid crystal which was composed of aromatic esters. Such combined material is commercially sold under the designation NM8250 by American Liquid Xtal Chemical Corp. of Kent, Ohio. Such material was mixed with a solution of 7% PVA, which had been purified to remove all salts. The solution also was made with ASTM-100 water. The resulting mixture was put into a colloid mill whose conegap setting was 4 mils, and the material was milled for four minutes to give a rather uniform particle suspension size. The result was a stable emulsion whose suspended particle size was approximately 3 microns. The emulsion was cast on a Mylar film which was precoated with a 200 ohm per square layer of indium tin oxide electrode purchased from Sierracin. A doctor blade was used to cast the emulsion material on the Mylar film on the electrode coated side.

A 7 mil lay-down of the emulsion material was placed on such electrode and was allowed to dry to a total thickness of 0.8 mil. A second layer of such emulsion subsequently was laid on the first with a resulting aggregate layer of liquid crystal droplets in a polyvinyl alcohol matrix having a thickness of 1.6 mil. Preferably the encapsulated liquid crystals may be laid down in a single layer one or plural capsules thick.

The thusly formed liquid crystal device, including the layer of Mylar, electrode, and encapsulated liquid crystals was then tested by applying an electric field, whereupon the material changed from black to nearly clear-transparent. The material exhibited a very wide viewing angle, i.e. the angle at which light was transmitted, and the contrast ratio was 7:1 at 50 volts of applied electric field. The switching speed was about two milliseconds on and about 4 milliseconds off.

EXAMPLE 2

900 grams of 7% high viscosity fully hydrolysed polymer (SA-72 of American Liquid Xtal Chemical Corp.), 100 grams of 8250 nematic liquid crystal material also of American Liquid Xtal Chemical Corp., 0.45 grams of C26510 Sudan Black B, and 0.15 grams of C26100 Sudan III (the latter two ingredients being pleochroic dyes), were used. The polymer was weighed out in a beaker. The liquid crystal was weighed out, was placed on a hot plate, and was heated slowly. The dye was weighed out on a balance and was added very slowly to the liquid crystal, being stirred until all the dye went into solution.

The liquid crystal and dye solution then was filtered through a standard Millipore filtering system using 8 m. filter paper. The filtered liquid crystal and dye solution was stirred into the polymer using a Teflon rod. Such mixture was encapsulated by placing the same in a colloid mill that was operated at medium shear for five minutes. The emulsion film was then pulled on a conductive polyester sheet.

In operation of such example, upon the application of a 10 volt electric field, the liquid crystal structure began to align, and at 40 volts reached saturation and maximum optical transmissivity.

EXAMPLE 3

The procedure of Example 2 was carried out using the same ingredients and steps except that a 5% high viscosity fully hydrolysed polymer, such as SA-72, was substituted for the 7% polymer of Example 2. Operational results were the same as in Example 2.

EXAMPLE 4

The process of Example 2 was carried out to make an emulsion using 4 grams of 20% medium viscosity, partly hydrolysed polymer (such as 405 identified in Table I above), 2 grams of 8250 nematic liquid crystal material having 0.08% of D-37 magenta pleochroic dye (a proprietary pleochroic dye manufactured and/or sold by E. Merck of West Germany) in the solution with the liquid crystal.

A slide was taken using a Teflon rod, and upon inspection showed medium size capsules of about 3 to 4 microns in diameter. The material was filtered through a Millipore screen filter and another slide was taken; on inspection there was very little change in capsule size from the first-mentioned inspection.

The emulsion was pulled onto a conductive polyester support film as in Example 2 using a doctor blade set a 5 mil gap. In operation, the encapsulated liquid crystal material began to align upon the application of an electric field of 10 volts and was at saturation or full on at from about 40 to 60 volts.

EXAMPLE 5

Using a glass rod cleaned and washed with deionized ASTM-100 water, 2 grams of 40% 8250 nematic liquid crystal material with 0.08% of D-37 pleochroic dye dissolved therein was stirred into 4 grams of 405 desalted 20% by weight medium hydrolysis medium viscosity polymer very carefully for approximately 15 minutes. The material was then placed through a Millipore screen filter approximately 4 microns in size. A slide was taken after the bubbles had dissipated. Thereafter, a film was pulled at a gap 5 mil setting on Intrex electrically conductive electrode film material that was placed on a polyester support of Mylar material. In operation it was evident that the liquid crystal material began aligning upon application of a 5 volt electric field. Contrast was good and the liquid crystal material was at full on or saturation upon the application of a 40 volt electric field.

EXAMPLE 6

This example used 8 grams of D-85 pleochroic dye dissolved in E-63 biphenyl liquid crystal. Such material is sold premixed by British Drug House, which is a subsidiary of E. Merck of West Germany. The example also used 16 grams of 20% PVA medium viscosity medium hydrolysis polymer as the encapsulating medium. The liquid crystal and pleochroic dye solution was mixed carefully by hand into the polymer at a slow rate. The combined material was then screened at a low shear. A slide was taken and on observation showed approximately 3 micron size capsules. A film of such emulsion was pulled onto an electrically conductive polyester sheet, as above, using a gap 5 mil setting. The film was on or began having liquid crystal structure align with the electric field at approximately 6 volts and was at saturation or full on at 24 volts.

EXAMPLE 7

A mixture was formed of 8250 nematic liquid crystal with 0.08% D-37 pleochroic dye in solution therewith and a solution of 15% AN169 Gantrez in 85% water. The mixture was of 15% liquid crystal and 85% Gantrez as the containment medium. The mixture was homogenized at low shear to form an emulsion, which was applied to an electrode/support film as above; such support film was about 1.2 mils thick. After drying of the emulsion, the resulting liquid crystal emulsion responded to an electric field generally as above, substantially absorbing or at least not substantially transmitting light when in field-off condition, showing a threshold of about 7 volts to begin transmitting, and having a saturation level of substantially maximum transmission at about 45 volts.

In accordance with the present invention the quantities of ingredients for making the encapsulated liquid crystal 11, for example in the manner described above, may be, as follows:

The liquid crystal material—This material may be from about 5% to about 20% and preferably about 50% (and in some circumstances even greater depending on the nature of the encapsulating material) including the pleochroic dye, by 25% (when using Gelvatol as the encapsulating material) volume of the total solution delivered to the mixing apparatus, such as a colloid mill. The actual amount of liquid crystal material used should ordinarily exceed the volume quantity of encapsulating medium, e.g. PVA to optimize the capsule size.

The PVA—The quantity of PVA in the solution should be on the order of from about 5% to about 50%, and possibly even greater depending on the hydrolysis and molecular weight of the PVA, and preferably, as described above, about 22%. For example, if the PVA has too large a molecular weight, the resulting material will be like glass, especially if too much PVA is used in the solution. On the other hand, if the molecular weight is too low, use of too little PVA will result in too low a viscosity of the material, and the resulting emulsion will not hold up well, nor will the droplets of the emulsion solidify adequately to the desired spherical encapsulated liquid crystals.

Carrier medium—The remainder of the solution would be water or other, preferably volatile, carrier medium, as described above, with which the emulsion can be made and the material laid down appropriately on a substrate, electrode or the like.

It will be appreciated that since the uncured capsules or droplets of encapsulating medium and liquid crystal material are carried in a liquid, various conventional or other techniques may be employed to grade the capsules according to size so that the capsules can be reformed if of an undersirable size by feeding again through the mixing apparatus, for example, and so that the finally used capsules will be of a desired uniformity for the reasons expressed above.

Although the encapsulation technique has been described in detail with reference to emulsification, since the fact that the encapsulant material and binder are the same makes facile the production of liquid crystal devices; the preparation of discrete capsules of the liquid crystal material may on occasion be advantageous, and the use of such discrete capsules (with a binder) is within the contemplated scope of this invention.

Although the presently preferred invention operates in response to application and removal of an electric field, operation also may be effected by application and removal of a magnetic field.

Turning now to FIGS. 15, 16, 17 and 18, interconnected volumes of liquid crystal generally are shown at 199. To form such interconnected volumes 199 the interconnecting paths 200 between respective liquid crystal particles or capsules 22, 162 that may be used to form a layer 34 (FIG. 4) are shown. The matrix 201 of the layer 34 is shown partially and in three dimensions along conventional x, y, z orthogonal axes. The matrix, slurry, dispersion, emulsion, in any event the layer 34, is shown in FIG. 15 comprised of orderedly aligned capsules one over and/or adjacent another for facility of illustration and explanation. However, it will be appreciated that the capsules may be in a more closely packed arrangement or other arrangement, as may be desired.

It has been discovered that the interconnecting passages 200 actually occur relatively randomly, and an effort to identify such random occurrence is made in FIG. 15. Some capsules may not be interconnected to others, while some capsules may be interconnected by one or more passages 200 to one or more other capsules. The interconnections can be continuous or substantially continuous in the layer 34, for example, or may be discontinuous. It is believed that the existence or not of the passages 200 may depend on the method and/or conditions of manufacturing the encapsulated liquid crystal material and/or the placing thereof in the layer 34. For example, the containment medium or encapsulating medium may be a water soluble material, such as polyvinyl alcohol, and the formation of interconnecting passages 200 or the failure of such formation to occur may be a function of the temperature at which water is removed from an emulsion of the liquid crystal material, polyvinyl alcohol and water and/or the rate of such removal. Whether the orientation of the liquid crystal structure relative to the internal wall of a respective capsule is parallel or normal to such wall, i.e. whether the capsule is of the type shown in FIG. 9 or in FIG. 10 described above, does not appear to affect the existence or not of the passages 200, and it is possible for such a passage 200 to connect a capsule 22 with a like capsule 22, a capsule 162 with a like capsule 162, or a capsule 22 with a capsule 162, and so on. Usually, though, there would not be expected two different types of capsules 22 (with liquid crystal structure distorted parallel to the capsule wall) and 162 (structure normal to the capsule wall) in the same matrix of support medium.

The existence or not of the passages 200 does not affect operation of the encapsulated liquid crystal in accordance with the present invention. Even though such passages 200 may exist, each capsule 22, 162 still may be considered a separate capsule volume having liquid crystal material therein. If there is an interconnecting passage 200 between a pair of capsules, such passage also would contain liquid crystal material and, therefore, the existence of such passage would not ordinarily effect a flow of liquid crystal material between capsules.

Regardless of whether or not such passages 200 occur in the layer 34, for example, operability of the encapsulated liquid crystal material and a device employing the same still would be based on the above described parameters and/or characteristics. Specifically, it is important that the ordinary index of refraction of the liquid crystal material be matched so as to be substantially identical to the index of refraction of the encapsulating medium to achieve maximum transparency or at least to minimize optical attenuation, scattering, absorption, etc., in the presence of an electric field; and there should not be a match of the extraordinary index of refraction of the liquid crystal material with respect to the index of refraction of the containment medium so that in the field-off condition scattering and/or absorption are maximized.

In FIGS. 16 and 17 the distorted, curvilinearly aligned liquid crystal material is shown in the parallel to the capsule wall or normal to the capsule wall orientations, respectively, of, for example, the capsules 22, 162. The interconnecting passage 200 may have liquid crystal material aligned normal or parallel to the wall of such passage. The overall containment medium 23 or 163 in which the capsules 22, 162 are formed are partially shown in FIGS. 16, 17.

In FIG. 18 the application of an electric field E to the capsules 22, 162 and passage 200 of FIGS. 16 and 17 is represented. In response to application of that electric field, the liquid crystal structure aligns with the field thereby reducing optical attenuation and, more particularly, increasing transmission, for example as was described in greater detail above. It will be clear from FIGS. 16, 17 and 18 that the existence of the passages 200 will not have any effect on transmission or attenuation. More specifically, in the field-off condition, the liquid crystal in the passages 200 will tend to absorb (especially if dye is included therewith) and/or to scatter light incident thereon because the structure of such liquid crystal will be generally distorted or the liquid crystal material will be randomly oriented in such passage. However, upon the application of the electric field E in FIG. 18 the liquid crystal material in the passage 200 aligns with the field and, therefore, such liquid crystal effectively becomes transparent, especially if the ordinary index of refraction thereof is substantially the same, preferably identical, to the index of refraction of the containment medium.

Whether the interconnect passages 200 occur or not will not affect the overall structural possibilities of a device made with the encapsulated liquid crystal of the present invention. Since such passages generally are random, since the matrix in which the capsules and/or passages are formed is relatively fixed in size, configuration, etc., and since preferably the volumes of the individual capsules as well as the volumes within the passages 200 preferably are filled with liquid crystal material, the liquid crystal material will not encounter any substantial flow. Accordingly, the aspect of the invention enabling use thereof for large size displays, light shutters, and the like still is practical even with such passages 200 occurring in the liquid crystal matrix, layer 34, etc.

Briefly referring to FIG. 19, now, a containment medium 230 is shown having therein operationally nematic liquid crystal material in accordance with the present invention. Such containment medium preferably is optically transparent or at least is selectively transparent in the electromagnetic frequency ranges desired. The containment medium 230 may be expanded foam or other relatively rigid material having internal cells that may be interconnected by passages that are smaller in cross section than the average cross section of a given cell. Exemplary materials of which the containment medium 230 may be formed include polyethylene and polypropylene. The liquid crystal material 231 contained in the containment medium 230 may be absorbed into the cells or chambers thereof after the containment medium has itself been formed, for example using expanded foam technology. The containment medium 230 and liquid crystal material therein may be employed as an integral device 234 which may be substituted for the layer 34 in FIG. 4, for example. Electrodes may be applied to the opposite surfaces of the device 234 to apply selectively an electric field causing parallel alignment of the liquid crystal material with respect thereto to achieve the above reduction in optical attenuation function. Removal of such field preferably will result in a distortion of the liquid crystal material or in any event the curvilinear alignment described above in the various cells and passages of the device 234.

In conclusion it will be appreciated that the various features of the present invention described in detail above and illustrated in the several figures of the drawings may be employed in a variety of liquid crystal devices, such as displays, optical shutters, light control devices, etc. The various features disclosed in the several embodiments may be employed with each other or independently. Pleochroic dye or other dye may be used in accordance with the invention to help effect absorption in the field-off condition and to reduce attenuation of the electromagnetic radiation in the field-on condition; pleochroic dye tends to assume the structure of the adjacent or mixed molecules or structure of the liquid crystal material, especially of the operationally nematic type. Various additives may be employed to force twists, to force return of the liquid crystal material back to the field-off condition promptly upon removing the electric field, and so on.

The embodiments of the invention in which an exclusive property or privilege is claimed are defined, as follows:

1. An encapsulated operationally nematic liquid crystal material, comprising
   operationally nematic liquid crystal material,
   containment medium means for containing said liquid crystal material in volumes,
   means for tending to orient at least some of the structure of said liquid crystal material generally normal to a wall of said containment medium means in the absence of an electric field, and
   wherein said liquid crystal exhibits positive dielectric anisotropy.

2. Liquid crystal material and a medium for containing such liquid crystal material in a plurality of interconnected volumes, said liquid crystal material having positive dielectric anisotropy, said liquid crystal material having an ordinary index of refraction and an extraordinary index of refraction which is different from said ordinary index of refraction.

3. The invention of claim 2, wherein a plurality of volumes of such liquid crystal material are not interconnected to other volumes.

4. Liquid crystal material and a medium for containing such liquid crystal material in a plurality of interconnected volumes, said liquid crystal material having positive dielectric anisotropy, said liquid crystal material comprising nematic liquid crystal material, said liquid crystal material having an ordinary index of refraction and an extraordinary index of refraction which is different from said ordinary index of refraction and said medium comprising means for aligning the liquid crystal material to achieve a substantially maximum absorption of light energy under a no field condition.

5. The invention of claim 4, wherein a plurality of volumes of such liquid crystal material are not interconnected to other volumes.

6. Liquid crystal material and a medium for containing such liquid crystal material in a plurality of interconnected volumes, said material having positive dielectric anisotropy, and said liquid crystal material having an ordinary index of refraction and an extraordinary index of refraction which is different from said ordinary index of refraction and said medium having a dielectric constant that is no less than the lower dielectric constant value of said material.

7. The invention of claim 6, wherein a plurality of volumes of such liquid crystal material are not interconnected to other volumes.

8. The combination of nematic liquid crystal material contained in a plurality of generally spherical capsule volumes of encapsulating medium, said encapsulating medium having a wall, wherein the ordinary index of refraction of said liquid crystal material is approximately the same as the index of refraction of the encapsulating medium, and wherein said ordinary index of refraction is different from an extraordinary index of refraction of said liquid crystal material.

9. The invention of claim 8, wherein a plurality of volumes of such liquid crystal material are not interconnected to other volumes.

10. Liquid crystal material and a medium for containing discrete quantities of such liquid crystal material in a plurality of interconnected volumes, said material comprising an operationally nematic material having positive dielectric anisotropy, said liquid crystal material having an ordinary index of refraction and an extraordinary index of refraction which is different from said ordinary index of refraction and said medium comprising means for tending physically to align said liquid crystal material with respect to said medium.

11. The invention of claim 10, wherein a plurality of volumes of such liquid crystal material are not interconnected to other volumes.

12. An operationally nematic liquid crystal material and a containment means for containing discrete quantities of such liquid crystal material in a plurality of interconnected volumes causing said material to fold in on itself creating storage of elastic energy in said material, and said liquid crystal material having an ordinary index of refraction and an extraordinary index of refraction which is different from said ordinary index of refraction.

13. The invention of claim 12, wherein a plurality of volumes of such liquid crystal material are not interconnected to other volumes.

14. A liquid crystal apparatus comprising an operationally nematic liquid crystal material contained in discrete quantities by a matrix of interconnected volumes formed of an emulsion of such liquid crystal material and a further medium, and said liquid crystal material having an ordinary index of refraction and an extraordinary index of refraction which is different from said ordinary index of refraction.

15. The invention of claim 14, wherein a plurality of volumes of such liquid crystal material are not interconnected to other volumes.

16. Liquid crystal apparatus, comprising liquid crystal material, and containment means containing plural interconnected volumes of said liquid crystal material for inducing a generally non-parallel alignment of said liquid crystal material which in response to such alignment absorbs light and which in response to a prescribed input reduces the amount of such absorption, and said liquid crystal material having an ordinary index of refraction and an extraordinary index of refraction which is different from said ordinary index of refraction.

17. The invention of claim 16, wherein a plurality of volumes of such liquid crystal material are not interconnected to other volumes.

18. A liquid crystal apparatus, comprising a plurality of volumes of liquid crystal material assembled in a medium, said assemblage of volumes of liquid crystal and medium characterized in having combined resistivity to allow an electric field to be impressed thereacross, said liquid crystal chartacterzied in having positive dielectric anisotropy and being operative to align with respect to such an applied electric field and further characterized to undergo alignment due to surface interaction with said medium in the absence of such an electric field, and the apparatus being further characterized in providing an optical response to an applied electric field by matching ordinary index of refraction of the liquid crystal with the index of refraction of the medium.

19. A liquid crystal apparatus, comprising a plurality of volumes of liquid crystal material assembled in a medium, said assemblage of volumes of liquid crystal and medium characterized in having combined resistivity to allow an electric field to be impressed thereacross, said liquid crystal characterized in having positive dielectric anisotropy and being operative to align with respect to such an applied electric field and further characterized to undergo alignment due to surface interaction with said medium in the absence of such an electric field, pleochroic dye contained in said liquid crystal material, and the apparatus being further characterized in providing an optical response to an applied electric field by alignment of such pleochroic dye contained in the liquid crystal material.

20. A liquid crystal apparatus as set forth in claim 19, wherein the apparatus is further characterized in providing optical response to an applied electric field by matching ordinary index of refraction of the liquid crystal with the index of refraction of the medium.

21. A liquid crystal apparatus, comprising a plurality of volumes of liquid crystal material assembled in a medium, said assemblage of volumes of liquid crystal and medium characterized in having electrical characteristics to allow an electric field to be impressed thereacross, said liquid crystal characterized in having positive dielectric anisotropy and being operative to align with respect to such an applied electric field and further characterized to undergo alignment due to surface interaction with said medium in the absence of such an electric field, and the apparatus being further characterized in providing an optical response to an applied electric field by matching ordinary index of refraction of the liquid crystal with the index of refraction of the medium.

22. A liquid crystal apparatus, comrising a plurality of volumes of liquid crystal material assembled in a medium, said assemblage of volumes of liquid crystal and medium characterized in having combined resistivity to allow an electric field to be impressed thereacross, said liquid crystal characterized in having positive dielectric anisotropy and being operative to align with respect to such an applied electric field and further characterized to undergo alignment due to surface interaction with said medium in the absence of such an electric field, and the apparatus being further characterized in providing an optical response to an applied electric field by matching ordinary index of refraction of the liquid crystal with the index of refraction of the medium; and
wherein said medium comprising a polymer.

23. Liquid crystal material and a medium for containing discrete quantities of such liquid crystal material in a plurality of interconnected volumes, said material having positive dielectric anisotropy, said liquid crystal material having an ordinary index of refraction substantially the same as the index of refraction of said medium, and wherein a plurality of volumes of such liquid crystal material are not interconnected to other volumes.

24. Liquid crystal material and a medium for containing discrete quantities of such liquid crystal material in a plurality of interconnected volumes, said material having positive dielectric anisotropy, said liquid crystal material comprising nematic liquid crystal material, and said medium comprising means for aligning the liquid crystal material to achieve a substantially maximum absorption of light energy under a no field condition, and wherein a plurality of volumes of such liquid crystal material are not interconnected to other volumes.

25. Liquid crystal material and a medium for containing discrete quantities of such liquid crystal material in a plurality of interconnected volumes, said material having positive dielectric anisotropy, said medium having dielectric constant that is no less than lower dielectric constant value of said material, and wherein a plurality of volumes of such liquid crystal material are not interconnected to other volumes.

26. Liquid crystal material and a medium for containing discrete quantities of such liquid crystal material in a pluality of interconnected volumes, said material comprising an operationally nematic material having positive dielectric anisotropy, and said medium comprising means for tending physically to align said liquid crystal material with respect to said medium, and wherein a plurality of volumes of such liquid crystal material are not interconnected to other volumes.

27. An operationally nematic liquid crystal material and a containment means for containing discrete quantities of such liquid crystal material in a plurality of interconnected volumes causing said material to fold in on itself creating storage of elastic energy in said material, and wherein a plurality of volumes of such liquid crystal material are not interconnected to other volumes.

28. A liquid crystal apparatus comprising an operationally nematic liquid crystal material contained in decrete quantities by a matrix of interconnected volumes formed of an emulsion of such liquid crystal material and a further medium, and wherein a plurality of volumes of such liquid crystal material are not interconnected to other volumes.

29. Liquid crystal apparatus, comprising liquid crystal material, and containment containing plural interconnected volumes of said liquid crystal material for inducing a generally non-parallel alignment of said liquid crystal material which in response to such alignment absorbs light and which in response to a prescribed input reduces the amount of such absorption, and wherein a plurality of volumes of such liquid crystal material are not interconnected to other volumes.

30. A liquid crystal apparatus, comprising a plurality of volumes of liquid crystal material assembled in a medium, said assemblage of volumes of liquid crystal and medium characterized in having combined resistivity to allow an electric field to be impressed thereacross, said liquid crystal characterized in having positive dielectric anisotropy and being operative to align with respect to such an applied electric field and further characterized to undergo alignment due to surface interaction with said medium in the absence of such an electric field, and the apparatus being further characterized in providing an optical response to an applied electric field by matching index of refraction characterized and/or when the liquid crystal contains pleochroic dye by alignment of such pleochoric dye contained in the liquid crystal material.

31. The apparatus of claim 30, wherein said medium comprises a compound selected from the group consisting of cyanoethyl cellulose, acrylonitrile butadiene rubbers, phenolics, polyvinyl alcohol, polyvinly fluride, phenol formaldehyde, cellulose acetate, polyvinyl chloride, urethane elastomers, cellulose nitrate, regenerated cellulos, chlorosulphonated polyethylene, polyacrylontrile, cellulose acetate butyrate, Nylon, polyester, urea formaldehyde, alkyd sasnd a mixture of two or more thereof.

32. The apparatus of claim 30, wherein said plurality of volumes comprises a plurality of interconnected volumes.

33. A method for adjusting the orientation of an operationally nematic liquid crystal material at a curved wall of a containment medium, comprising:
adding to the liquid crystal material a species which tends to align such liquid crystal material in a direction generally normal to a wall of such containment medium.

* * * * *

UNITED STATES PATENT AND TRADEMARK OFFICE
CERTIFICATE OF CORRECTION

PATENT NO. : 5,089,904
DATED : February 18, 1992
INVENTOR(S) : James L. Fergason It is certified that error appears in the above-identified patent and that said Letters Patent is hereby corrected as shown below:

Column 6, line 41; change "inut" to -- input --.

Column 15, line 9; change "$\Theta$" to -- $\Theta'$ --.

Column 15, line 64; change "70e" to -- 70e' --.

Column 16, line 3; change "70e" to -- 70e' --.

Column 16, line 6; change "60" to -- 40 --.

Column 17, line 14; change "cholosteric" to -- cholesteric --.

Column 20, line 55; change "moeity" to -- moiety --.

Column 22, line 40; change "50" to -- 150 --.

Column 22, line 51; change "electrode." to -- electrode). --.

Column 23, line 57; change "151" to -- 150 --.

Column 23, line 58; change "102" to -- 172 --.

Column 24, line 67; change "111" to -- 181 --.

Column 25, line 58; change "$X_H$" to -- $X_G$ --.

Column 25, line 59; change "$X_G$" to -- $X_H$ --.

Column 26, line 7; change "$X_H$" to -- $X_G$ --.

Column 26, line 10; "$X_H > X_G$" to -- $X_G > X_H$ --.

UNITED STATES PATENT AND TRADEMARK OFFICE
CERTIFICATE OF CORRECTION

PATENT NO. : 5,089,904
DATED : February 18, 1992
INVENTOR(S) : James L. Fergason It is certified that error appears in the above-identified patent and that said Letters Patent is hereby corrected as shown below:

IN THE DRAWINGS:

Drawing Sheet 1, Fig. 4, the reference numeral 12 should be applied to the substrate, and the substrate surface should be designated by the reference numeral 31; Fig. 5, the reference numeral 70e' should be applied to the scattered light beam exiting interface 64 as light beam 70f. Also in Fig. 5, the reference numeral 42 should be applied to the back or non-viewing side of the display.

Drawing Sheet 2, Fig. 7, the reference numeral 88b, instead of 86B, should be applied to beam 88 shown being internally reflected.

Drawing Sheet 3, Fig. 11, the reference numeral 11 should be applied to the encapsulated liquid crystal material; the reference numeral 20 should be applied to the liquid crystal material; the reference numeral 150 should be applied to the interior wall surface; the reference numeral 154 should be applied to the defining wall in place of the reference 54; the reference numeral 173 should be applied to the exterior wall surface; the reference numeral 174 should be applied to the upper portion of the liquid crystal material in place of reference numeral 74; and the reference numeral 175 should be applied to the lower portion of the liquid crystal material in place of the reference numeral 75; reference numeral 22 should be added to the capsule; Fig. 12, the

UNITED STATES PATENT AND TRADEMARK OFFICE
CERTIFICATE OF CORRECTION

PATENT NO. : 5,089,904
DATED : February 18, 1992
INVENTOR(S) : James L. Fergason It is certified that error appears in the above-identified patent and that said Letters Patent is hereby corrected as shown below:

reference numeral 150 should be applied to the plate of the capacitor 171 in place of the reference numeral 151.

IN THE CLAIMS:

Column 36, line 48, change "chartacterzied" to -- characterized --.

Column 37, line 25, change "comrising" to -- comprising --.

Column 37, lines 61-62, change "having dielectric" to -- having a dielectric --.

Column 37, line 62, change "than lower" to -- than the lower --.

Column 38, line 23, change "containment containing" to -- containment means containing --.

UNITED STATES PATENT AND TRADEMARK OFFICE
CERTIFICATE OF CORRECTION

PATENT NO. : 5,089,904
DATED : February 18, 1992
INVENTOR(S) : James L. Fergason It is certified that error appears in the above-indentified patent and that said Letters Patent is hereby corrected as shown below:

Column 38, line 43, change "characterized" to -- characteristics --.
Column 38, line 45, change "pleochoric" to -- pleochroic --.
Column 38, line 50, change "polyvinly fluride," to -- polyvinyl fluoride --.
Column 38, line 53, change "cellulos" to -- cellulose --.
Column 38, line 55, change "alkyd sasnd" to -- alkyd, and --.

Signed and Sealed this

Twenty-eight Day of February, 1995

BRUCE LEHMAN

Attest:

Attesting Officer

Commissioner of Patents and Trademarks